United States Patent
Tang et al.

(10) Patent No.: US 12,443,565 B2
(45) Date of Patent: Oct. 14, 2025

(54) FILE OPENING METHOD AND DEVICE

(71) Applicant: Huawei Technologies Co., Ltd., Shenzhen (CN)

(72) Inventors: Guoqing Tang, Shanghai (CN); Sheng Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/004,635

(22) PCT Filed: Jun. 30, 2021

(86) PCT No.: PCT/CN2021/103515
§ 371 (c)(1),
(2) Date: Jan. 6, 2023

(87) PCT Pub. No.: WO2022/007678
PCT Pub. Date: Jan. 13, 2022

(65) Prior Publication Data
US 2023/0273902 A1    Aug. 31, 2023

(30) Foreign Application Priority Data

Jul. 7, 2020  (CN) .......................... 202010648535.5

(51) Int. Cl.
*G06F 16/176*  (2019.01)
*G06F 3/04817*  (2022.01)
(Continued)

(52) U.S. Cl.
CPC ........ *G06F 16/176* (2019.01); *G06F 3/04817* (2013.01); *G06F 3/1431* (2013.01); *G06F 3/1454* (2013.01); *G06F 16/182* (2019.01)

(58) Field of Classification Search
None
See application file for complete search history.

(56) References Cited

U.S. PATENT DOCUMENTS

2012/0113029 A1*  5/2012  Ye .......................... G06F 3/1454
                                                  345/173
2012/0324368 A1* 12/2012  Putz ...................... G06F 3/0486
                                                  715/748
(Continued)

FOREIGN PATENT DOCUMENTS

CN    102810102 A    12/2012
CN    104506650 A     4/2015
(Continued)

OTHER PUBLICATIONS

Huawei notebook multi-screen collaboration 2.0 file opening experience, Apr. 17, 2020 02:06:25, URL:https://www.bilibili.com/video/av327754719/, Video 1st second to 3rd minute 59 seconds, 3 pages.
(Continued)

*Primary Examiner* — Kannan Shanmugasundaram
(74) *Attorney, Agent, or Firm* — Slater Matsil, LLP

(57) ABSTRACT

This application relates to a file opening method and a device. A first device displays a first interface, and projects the first interface onto a second interface of a second device, where the first interface includes at least one file icon, the second interface includes the first interface, and a file corresponding to the at least one file icon is stored in the first device. The first device detects an operation performed on the file icon. When the file icon is an icon displayed on the first interface, the first device invokes a first application to open the file; or when the file icon is an icon displayed on the second interface, the first device sends metadata of the file to the second device, where the metadata of the file is used to open the file on the second device.

12 Claims, 21 Drawing Sheets

(51) Int. Cl.
    *G06F 3/14*        (2006.01)
    *G06F 16/182*      (2019.01)

(56) References Cited

U.S. PATENT DOCUMENTS

| | | | |
|---|---|---|---|
| 2013/0097518 | A1 | 4/2013 | Pearcy |
| 2015/0319200 | A1 | 11/2015 | Nguyen et al. |
| 2016/0077706 | A1 | 3/2016 | Haggar et al. |
| 2016/0344819 | A1* | 11/2016 | Beveridge ............... H04W 4/00 |
| 2016/0371048 | A1* | 12/2016 | Morris .................. G06F 40/197 |
| 2017/0024100 | A1 | 1/2017 | Pieper et al. |
| 2017/0161056 | A1* | 6/2017 | Raanan ................. G06F 3/0637 |

FOREIGN PATENT DOCUMENTS

| | | |
|---|---|---|
| CN | 109669657 A | 4/2019 |
| CN | 109739450 A | 5/2019 |
| CN | 110618971 A | 12/2019 |
| CN | 110716906 A | 1/2020 |
| CN | 111158543 A | 5/2020 |
| CN | 111327769 A | 6/2020 |
| JP | 2014219706 A | 11/2014 |

OTHER PUBLICATIONS

Oneshot, Meetime, Multi-screen Collaboration, Celia, What are the new features of EMUI 10.1? , https://www.youtube.com/watch?v=UQODZS9YOkA, May 20, 2020, 2 pages.

\* cited by examiner

FILE OPENING METHOD AND DEVICE

CROSS-REFERENCE TO RELATED APPLICATIONS

This application is a National Stage of International Application No. PCT/CN2021/103515, filed on Jun. 30, 2021, which claims priority to Chinese Patent Application No. 202010648535.5, filed on Jul. 7, 2020, all of which are hereby incorporated by reference in their entireties.

TECHNICAL FIELD

This application relates to the field of communication technologies, and in particular, to a file opening method and a device.

BACKGROUND

With development of intelligent terminals, there are more and more scenarios in which one user has a plurality of intelligent terminals, for example, devices such as a smartphone, a tablet computer (PAD), and a personal computer (PC). The interconnection between a plurality of devices brings good user experience.

Currently, to improve user experience, a multi-screen collaboration function (or referred to as a multi-device collaboration function) is provided. With the multi-screen collaboration function, a file on one device can be opened on another device. For example, if a mobile phone and a PC perform multi-screen collaboration, a display interface of the mobile phone is displayed on a display of the PC, and the display interface of the mobile phone displayed on the PC may also be understood as a projection interface. A user performs an operation on the projection interface on the PC. For example, the user chooses to open a file A. In this case, the file A may be opened on the PC. Alternatively, the user performs an operation on the mobile phone. For example, the user chooses to open a file B. Similarly, the file B may be opened on the PC but not the mobile phone. Compared with the mobile phone, the PC has a larger display area. The user can view the file on the PC to improve a viewing effect.

It can be learned that in a multi-screen collaboration scenario, regardless of which device a user performs an operation on, a response is made on one of the devices participating in multi-screen collaboration. For example, during the multi-screen collaboration between the mobile phone and the PC, regardless of whether a user performs an operation on the mobile phone or the PC to open a file, the file is opened on the PC but not on the mobile phone. However, if the user actually wants to view the file on the mobile phone, this cannot be implemented in the current manner. The user can normally open and view corresponding content on the mobile phone only after exiting the multi-screen collaboration mode. However, this process requires a plurality of steps, which is complex.

SUMMARY

Embodiments of this application provide a file opening method and a device, to simplify a file opening procedure.

According to a first aspect, a file opening method is provided. The method includes: A first device and a second device enter a multi-screen collaboration mode in a preset manner. The first device displays a first interface and projects the first interface onto a second interface of the second device, where the first interface includes at least one file icon, the second interface includes the first interface, and a file corresponding to the at least one file icon is stored in the first device. The first device detects an operation performed on the file icon. The first device determines whether the operation is performed on a display of the first device or a display of the second device. When the operation is performed on the display of the first device, the first device invokes a first application to open the file; or when the operation is performed on the display of the second device, the first device sends metadata of the file to the second device, where the metadata of the file is used to open the file on the second device.

The method may be performed by the first device. The first device is, for example, a mobile device such as a mobile phone, a tablet computer (PAD), or a portable computer. Alternatively, the first device may be a device at a fixed location, for example, a desktop computer at a fixed location.

The first device performs projection onto the second device. In a current manner, a user performs an operation on the first device to open a corresponding file, and the file should be opened on the second device. However, in this embodiment of this application, if the first device detects that a user performs an operation on the display of the first device, the file can be locally opened on the first device but not on the second device. If the user performs an operation on the display of the first device, it indicates that the user may use the first device currently, and it is clearly that opening the file on the first device is more convenient for the user to view. In the manner provided in this embodiment of this application, because the file can be opened on the first device, the user does not need to exit the multi-screen collaboration mode, and naturally does not need to perform a plurality of steps. This simplifies a file opening procedure, reduces a quantity of response times of a device, and helps reduce power consumption of the device. In addition, if the first device determines that the user performs an operation on the display of the second device, the file can also be opened on the second device. That is, according to the method provided in this embodiment of this application, a current focus of attention of the user can be determined based on a user operation, so that a corresponding device is selected to open a file. This is more conducive to viewing of the user, and avoids excessive operation steps of the user.

In a possible implementation, the method further includes:

The first device receives an updated file from the second device, where the updated file is the first file that is updated.

The first device updates the locally stored file with the updated file.

If the file is opened on the second device, the user may perform an editing operation on the file on the second device. For example, the user may modify the file. After the user performs the editing operation on the file, a modified file may be stored on the second device, and the modified file is, for example, referred to as an updated file. The second device may send the updated file to the first device, and the first device may update the original file stored in the first device with the updated file. In this way, the file is updated.

In a possible implementation, that the first device detects an operation performed on the file icon includes:

The first device receives event information from the second device, where the event information is used to indicate the operation, and the event information includes an identifier of the second device.

If the user performs an operation on the display of the first device, the first device can directly collect the operation of the user, or in other words, the first device can capture an operation event of the user. Therefore, if the first device can collect the operation of the user, it can be determined that the operation is performed on the display of the first device. If the user performs an operation on the display of the second device, the first device cannot directly collect the operation of the user, but the second device may collect the operation of the user. In other words, the second device can capture an operation event of the user to obtain event information corresponding to the operation event, and the second device can send the event information to the first device. The event information may indicate the operation, or in other words, the event information may describe the operation. The event information may include an identifier of the second device, to indicate that an operation corresponding to the event information is performed on the second device.

In a possible implementation, that the first device determines that the operation is performed on the display of the second device includes:

The first device determines, based on the identifier of the second device, that the operation is performed on the display of the second device.

For example, the event information may include the identifier of the second device, so that the first device can determine, after obtaining the event information, that the operation is performed on the display of the second device. Optionally, the event information may further include information such as relative position coordinates of the operation on the first interface displayed on the second device, so that the first device can determine a file corresponding to the operation of the user. In this manner, the first device can determine an operation focus of the user, to select a device on which the file is to be opened.

In a possible implementation, that the first device sends metadata of the file to the second device includes:

The first device synchronizes (or sends) the metadata of the file to a distributed file system of the second device by using a distributed file system of the first device.

The distributed file system may be set on both the first device and the second device. For example, the distributed file system may be used to manage a file, and some information related to the file can be synchronized between the first device and the second device by using the distributed file system. Therefore, the first device can synchronize the metadata of the file by using the distributed file system. Certainly, the first device may also send the metadata of the file to the second device in another manner. This is not specifically limited.

In a possible implementation, before the first device invokes the first application to open the file, the method further includes:

The first device outputs prompt information, where the prompt information includes one or more options, and the one or more options are used to determine a device on which the file is to be opened.

The first device detects an operation of selecting a first option in the one or more options, where the first option corresponds to the first application.

In other words, even if the first device determines that the user performs an operation on the display of the first device, the first device can still output the prompt information, so that the user selects a device on which the file is to be opened. If the user chooses to open the file on the first device, the file is opened on the first device according to the selection of the user. In this manner, a device on which the file is opened better meets a requirement of the user, and this is more conducive to viewing of the user.

In a possible implementation, the first device outputs prompt information when the operation is performed on the display of the first device, where the prompt information includes one or more options, and the one or more options are used to determine a device on which the file is to be opened.

The first device detects an operation of selecting a second option in the one or more options, where the second option is used to indicate to open the file on the second device.

The first device sends the metadata of the file to the second device, where the metadata of the file is used to open the file on the second device.

Even if the first device determines that the user performs an operation on the display of the first device, the first device can still output the prompt information, so that the user selects a device on which the file is to be opened. If the user chooses to open the file on the second device, the file is opened on the second device according to the selection of the user. For example, sometimes although the user performs an operation on the first device, the user actually expects to present a corresponding file on the second device to another user for viewing. In this scenario, according to the technical solution provided in this embodiment of this application, the user may choose to open the file on a portable computer, so as to complete a presentation process. It can be learned that according to the technical solution provided in this embodiment of this application, a selection opportunity is provided for the user, and it is more convenient for the user to select a proper device to open a corresponding file.

In a possible implementation, the metadata of the file includes storage path information of the file in the first device.

The metadata of the file may include the storage path information of the file in the first device, so that after obtaining the metadata of the file, the second device can obtain the file from the first device based on the storage path information, to locally open the file on the second device.

In a possible implementation, the metadata of the file further includes one or more of the following: type information of the file, size information of the file, or a name of the file.

In addition to the storage path information of the file in the first device, the metadata of the file may further include other information, for example, the type information of the file or the size information of the file, so that the second device can obtain more information about the file.

According to a second aspect, a second communication method is provided. The method includes: A first device and a second device enter a multi-screen collaboration mode in a preset manner. The first device displays a first interface and projects the first interface onto a second interface of the second device, where the first interface includes at least one file icon, the second interface includes the first interface, and a file corresponding to the at least one file icon is stored in the first device. The first device detects an operation performed on the file icon. When the file icon is an icon displayed on the first interface of the first device, the first device invokes a first application to open the file; or when the file icon is an icon displayed on the second interface, the first device sends metadata of the file to the second device, where the metadata of the file is used to open the file on the second device.

The method may be performed by the first device. The first device is, for example, a mobile device such as a mobile phone, a tablet computer, or a portable computer. Alternatively, the first device may be a device at a fixed location, for example, a desktop computer at a fixed location.

In a possible implementation, the method further includes:

The first device receives an updated file from the second device, where the updated file is the file that is updated.

The first device updates the locally stored file with the updated file.

In a possible implementation, that the first device detects an operation performed on the file icon includes:

The first device receives event information from the second device, where the event information is used to indicate the operation, and the event information includes an identifier of the second device; or the first device detects, on the first device, event information generated by the operation.

That the first device detects, on the first device, the event information generated by the operation may be understood as: The first device detects the operation on the first device, and obtains the event information corresponding to the operation. Therefore, it may be considered that the first device detects, on the first device, the event information generated by the operation, or it may be understood that the first device detects, on the first device, the event information corresponding to the operation. That is, the former understanding is that the first device detects the operation and obtains the event information, and the latter understanding is that the first device detects the event information, where the event information corresponds to the operation.

In a possible implementation, that the first device determines that the file icon is an icon displayed on the second interface includes:

The first device determines, based on the identifier of the second device, that the file icon is an icon displayed on the second interface.

In a possible implementation, that the first device sends metadata of the file to the second device includes:

The first device sends the metadata of the file to a distributed file system of the second device by using a distributed file system of the first device.

In a possible implementation, before the first device invokes the first application to open the file, the method further includes:

The first device outputs prompt information, where the prompt information includes one or more options, and the one or more options are used to determine a device on which the file is to be opened.

The first device detects an operation of selecting a first option in the one or more options, where the first option corresponds to the first application.

In a possible implementation, the method further includes:

The first device outputs prompt information when the file icon is an icon displayed on the first interface, where the prompt information includes one or more options, and the one or more options are used to determine a device on which the file is to be opened.

The first device detects an operation of selecting a second option in the one or more options, where the second option is used to indicate to open the file on the second device.

The first device sends the metadata of the file to the second device, where the metadata of the file is used to open the file on the second device.

In a possible implementation, the metadata of the file includes storage path information of the file in the first device.

In a possible implementation, the metadata of the file further includes one or more of the following: type information of the file, size information of the file, or a name of the file.

For technical effects brought by the second aspect or the possible implementations of the second aspect, refer to the descriptions of the technical effects brought by the first aspect or the corresponding implementations.

According to a third aspect, an electronic device is provided. The electronic device includes a display, one or more processors, a memory, and one or more programs. The one or more programs are stored in the memory, the one or more programs include instructions, and when the instructions are executed by the electronic device, the electronic device is enabled to perform the method according to any one of the first aspect or the possible implementations of the first aspect, or the electronic device is enabled to perform the method according to any one of the second aspect or the possible implementations of the second aspect.

According to a fourth aspect, an electronic device is provided. The electronic device includes a module/unit configured to perform the method according to any one of the first aspect or the possible implementations of the first aspect, or the electronic device includes a module/unit configured to perform the method according to any one of the second aspect or the possible implementations of the second aspect.

According to a fifth aspect, a computer-readable storage medium is provided. The computer-readable storage medium stores a computer program. When the computer program is run on a computer, the computer is enabled to perform the method according to any one of the first aspect or the possible implementations of the first aspect, or the computer is enabled to perform the method according to any one of the second aspect or the possible implementations of the second aspect.

According to a sixth aspect, a computer program product including instructions is provided. The computer program product is configured to store a computer program. When the computer program is run on a computer, the computer is enabled to perform the method according to any one of the first aspect or the possible implementations of the first aspect, or the computer is enabled to perform the method according to any one of the second aspect or the possible implementations of the second aspect.

According to a seventh aspect, a communications system is provided. The communications system includes the electronic device according to the third aspect, or includes the electronic device according to the fourth aspect.

In an optional implementation, the communications system further includes a second device, and the second device is the second device according to the first aspect or the implementations, or the second device according to the second aspect or the implementations.

According to the method provided in embodiments of this application, a current focus of attention of the user can be determined based on a user operation, so that a corresponding device is selected to open a file. This is more conducive to viewing of the user, and avoids excessive operation steps of the user.

DETAILED DESCRIPTION OF ILLUSTRATIVE EMBODIMENTS

Figure 1:
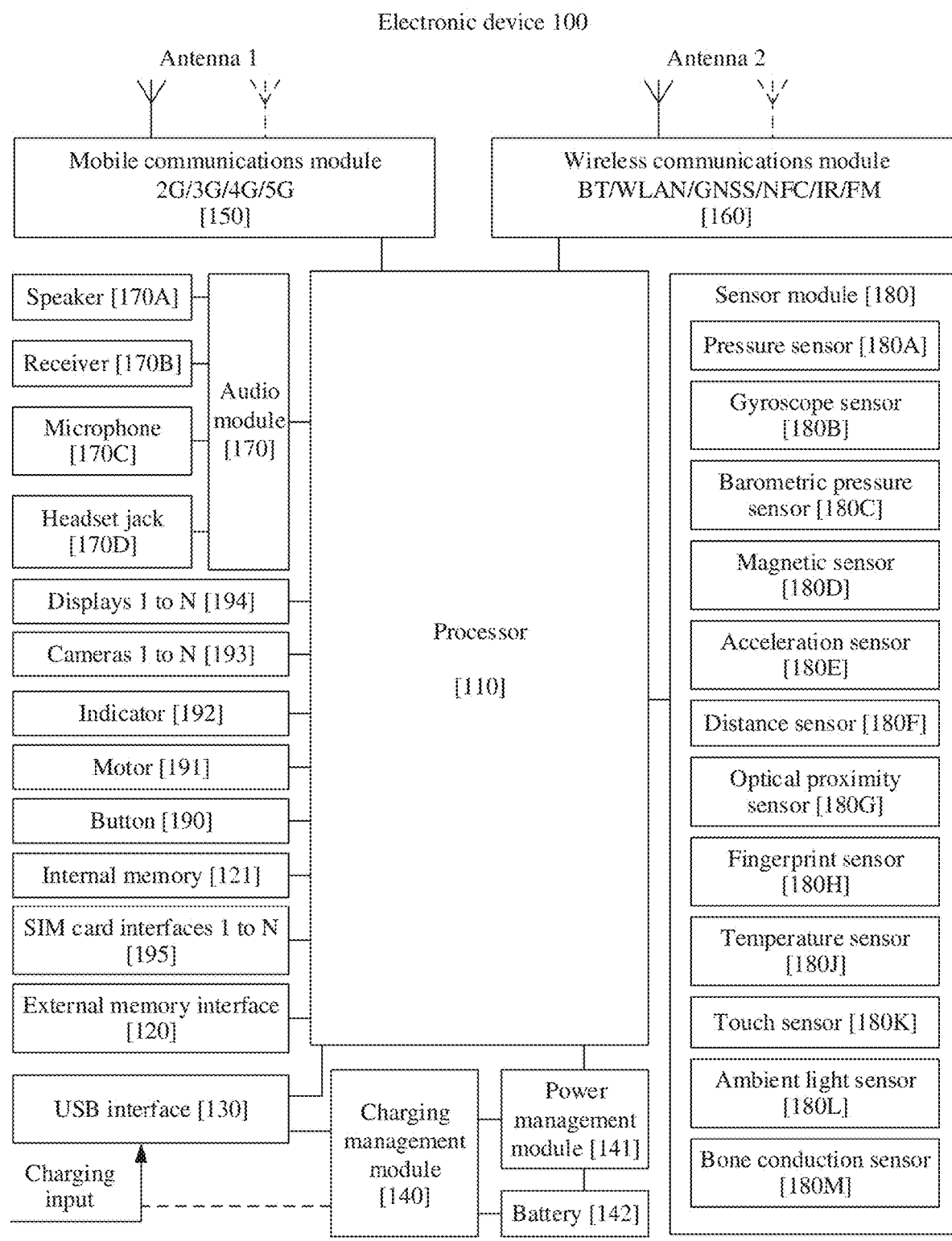
FIG. 1 is a schematic diagram of a structure of an electronic device.

To make objectives, technical solution, and advantages of embodiments of this application clearer, the following further describes embodiments of this application in detail with reference to the accompanying drawings.

The following describes some terms in embodiments of this application, to facilitate understanding of a person skilled in the art.

An application (application, app) in this application is a software program that can implement one or more specific functions. Usually, a plurality of applications may be installed on an electronic device, for example, a Camera application, a Messages application, a multimedia message application, an image application, various Email applications, WeChat (WeChat), WhatsApp Messenger, Line (Line), Instagram (instagram), or Kakao Talk. The application in the following may be an application installed when the electronic device is delivered from a factory, or may be an application (for example, an application sent by another electronic device) downloaded by a user from a network or obtained from another electronic device in a process of using the electronic device.

A file in this application is, for example, a multimedia file such as an image file, a video file, or an audio file, or may be a text file, for example, a Microsoft (Microsoft) Office (office) file such as a Word file, an Excel file, or a PowerPoint file; or may be a picture file such as a Microsoft Office Visio file or a Photoshop file corresponding to a drawing application.

In embodiments of this application, "at least one" means one or more, and "a plurality of" means two or more. A term "and/or" describes an association relationship between associated objects and indicates that there may be three relationships. For example, A and/or B may represent the following three cases: Only A exists, both A and B exist, and only B exists, where A and B may be singular or plural. The character "/" usually represents an "or" relationship between the associated objects. "At least one of the following" or a similar expression indicates any combination of the items, and includes any combination of singular items or plural items. For example, at least one of a, b, or c may indicate: a, b, c, a and b, a and c, b and c, or a, b, and c, where a, b, and c may be singular or plural.

In addition, unless otherwise stated, in embodiments of this application, ordinal numbers such as "first" and "second" are intended to distinguish between a plurality of objects, but are not intended to limit sizes, content, orders, time sequences, priorities, importance, or the like of the plurality of objects. For example, a second file and a second file are merely used to distinguish between different files, but do not indicate different sizes, content, priorities, importance, or the like of the two files.

The technical solutions provided in this application may be applied to an electronic device. The following describes an electronic device, a graphical user interface (graphical user interface, GUI) used for the electronic device, and embodiments used for using the electronic device. In some embodiments of this application, the electronic device may be a portable electronic device, such as a mobile phone, a PAD, a portable computer, a wearable device (such as a smartwatch, smart glasses, a smart band, or a smart helmet) with a wireless communication function, or a vehicle-mounted device. An example embodiment of the portable electronic device includes but is not limited to a portable electronic device using iOS®, Android®, Microsoft®, or another operating system. It should be further understood that in some other embodiments of this application, the electronic device may not be a portable device, but a desktop computer such as a PC that can collect an image and run an image compression algorithm to compress the image.

For example, FIG. 1 is a schematic diagram of a structure of an electronic device 100.

It should be understood that the electronic device 100 shown in the figure is merely an example, and the electronic device 100 may have more or fewer components than those shown in the figure, may combine two or more components, or may have different component configurations. Various components shown in the figure may be implemented in hardware, software, or a combination of hardware and software that includes one or more signal processing and/or application-specific integrated circuits.

As shown in FIG. 1, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The following specifically describes each part of the electronic device 100 with reference to FIG. 1.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors. The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory, to avoid repeated access and reduce a waiting time of the processor 110. Therefore, system efficiency can be improved.

The processor 110 may run the file opening method provided in embodiments of this application. For example, embodiments of this application provide manager software. The manager software may be a software module, the software module may run on the processor 110, and the software module may be understood as a computer program. For another example, embodiments of this application further provide projection software. The projection software may be a software module, the software module may run on the processor 110, and the software module may be understood as a computer program. The manager software and the projection software may be a same software module, or the manager software and the projection software may be different software modules. In addition, the manager software may be software that runs independently, or may be a part of system software. Similarly, the projection software may be software that runs independently, or may be a part of system software. When different components are integrated in the processor 110, for example, a CPU and a GPU are integrated, the CPU and the GPU may cooperate to perform the method provided in embodiments of this application. For example, in the method provided in embodiments of this application, some algorithms are performed by the CPU, and the other algorithms are performed by the GPU, to obtain fast processing efficiency.

In some embodiments, the processor 110 may include one or more interfaces. For example, the interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

A wireless communication function of the electronic device 100 may be implemented through the antenna 1, the antenna 2, the mobile communications module 150, the wireless communications module 160, the modem processor, the baseband processor, and the like. The antenna 1 and the antenna 2 are configured to transmit and receive an electromagnetic wave signal. Each antenna in the electronic device 100 may be configured to cover one or more communication bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some function modules of the mobile communications module 150 may be disposed in the processor 110. In some embodiments, at least some function modules of the mobile communications module 150 may be disposed in a same device as at least some modules of the processor 110.

The wireless communications module 160 may provide a wireless communication solution that is applied to the electronic device 100 and that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, and an infrared (infrared, IR) technology. The wireless communications module 160 may be one or more components integrating at least one communications processor module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or satellite based augmentation systems (satellite based augmentation systems, SBAS).

It may be understood that an interface connection relationship between modules illustrated in embodiments of this application is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The electronic device 100 implements a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like.

The electronic device 100 may implement a photographing function or an image capture function by using the camera 193, the ISP, the video codec, the GPU, the display 194, the application processor, and the like.

The ISP may be configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated through the lens, and is projected onto the photosensitive element. The photosensitive element may be a charge-coupled device (charge coupled device, CCD) or a complementary metal-oxide-semiconductor (complementary metal-oxide-semiconductor, CMOS) photoelectric transistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transfer between human brain neurons, and may further continuously perform self-learning. Applications such as intelligent cognition of the electronic device 100 may be implemented through the NPU, for example, image recognition, facial recognition, speech recognition, and text understanding.

The internal memory 121 may be configured to store computer-executable program code, and the executable program code includes instructions. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS). The processor 110 runs the instruction stored in the internal memory 121 and/or the instruction stored in the memory disposed in the processor, to execute various function applications of the electronic device 100 and data processing.

The external memory interface 120 may be configured to connect to an external storage card, for example, a micro SD card, to extend a storage capability of the electronic device.

The external memory card communicates with the processor 110 through the external memory interface 120, to implement a data storage function. For example, a file such as a picture or a video is stored in the external storage card.

The electronic device 100 may implement an audio function, for example, music playing and recording, by using the audio module 170, the speaker 170A, the receiver 170B, the microphone 170C, the headset jack 170D, the application processor, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The button 190 includes a power button, a volume button, and the like. The button 190 may be a mechanical button, or may be a touch button. The electronic device 100 may receive a button input, and generate a button signal input related to user setting and function control of the electronic device 100. The motor 191 may generate a vibration prompt. The indicator 192 may be an indicator, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the electronic device 100.

It can be understood that the components shown in FIG. 1 do not constitute a specific limitation on the electronic device 100. The mobile phone may further include more or fewer components than those shown in the figure, or combine some components, or split some components, or have different component arrangements. In addition, a combination/connection relationship between the components in FIG. 1 may also be adjusted and modified.

This application provides a first device and a second device. For example, the first device may be implemented as the electronic device 100, or may be a chip or another functional component (in this case, the first device may also be referred to as a first apparatus) disposed in the electronic device 100, or the first device may be implemented in another form. For example, the second device may be implemented as the electronic device 100, or may be a chip or another functional component (in this case, the second device may also be referred to as a second apparatus) disposed in the electronic device 100, or the second device may be implemented in another form. One or more of the microphone 170C, the camera 193, the fingerprint sensor 180H, the touch sensor 180K, or the bone conduction sensor 180M shown in FIG. 1 may collect an operation of a user in this application. Alternatively, embodiments of this application may provide some peripheral input devices to collect an operation of a user. For example, the electronic device 100 is connected to some peripheral input devices, and these peripheral input devices can collect the operation of the user. The peripheral input device includes, for example, a keyboard or a mouse.

This application further provides a multi-screen collaboration system. The multi-screen collaboration system may include the first device and the second device. Certainly, the multi-screen collaboration system may further include another device. For example, three or more devices may also perform multi-screen collaboration. In embodiments of this application, a multi-screen collaboration process between two devices is mainly used as an example.

Currently, in a multi-screen collaboration (or referred to as multi-device collaboration) scenario, regardless of which device a user performs an operation on, a response is made on one of the devices participating in multi-screen collaboration. For example, during multi-screen collaboration between a mobile phone and a PC, regardless of whether a user performs an operation on the mobile phone or the PC to open a file, the file is opened on the PC but not on the mobile phone. However, if the user actually wants to view the file on the mobile phone, this cannot be implemented in the current manner. The user can normally open and view corresponding content on the mobile phone only after exiting the multi-screen collaboration mode. However, this process requires a plurality of steps, which is complex.

Figure 2:
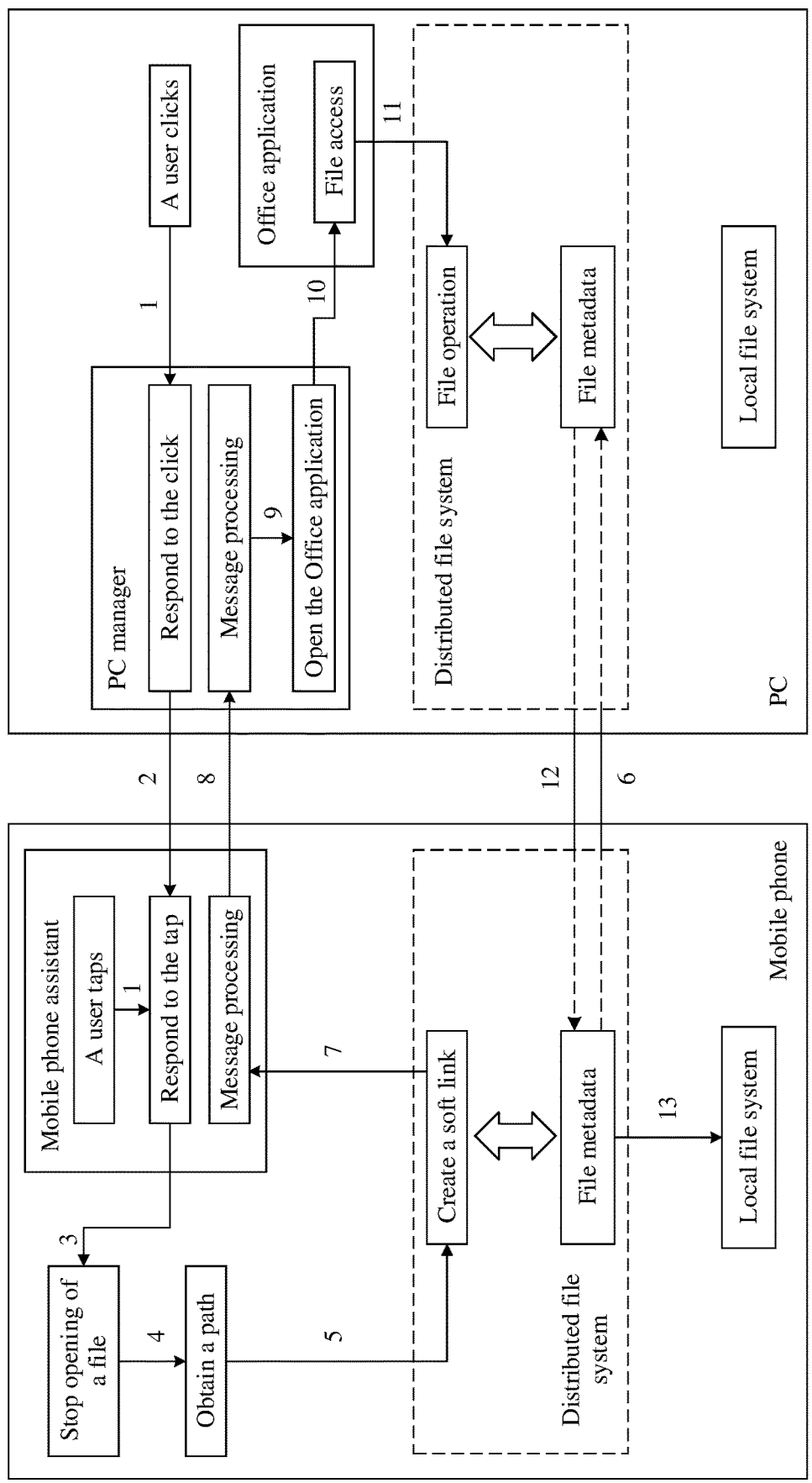
FIG. 2 is a schematic diagram of a current process of opening a file in a multi-screen collaboration mode.

For example, a user performs an operation by using a mobile phone, and a file in the mobile phone needs to be opened on a personal computer (personal computer, PC) for a user using the PC to view. In this way, two users do not need to use the mobile phone at the same time. A display of the PC is larger, which can also bring a better viewing effect. In this case, the mobile phone and the PC may enter a multi-screen collaboration mode. The mobile phone may open a file in the multi-screen collaboration mode, and the file is displayed on the PC. FIG. 2 is a schematic diagram of a process of opening a file in the multi-screen collaboration mode.

In FIG. 2, 1 indicates that a user taps a file displayed on a display of the mobile phone, and a mobile phone assistant (or referred to as a mobile phone PC assistant) installed on the mobile phone obtains tap operation information of the user and responds to the tap operation. Alternatively, in FIG. 2, 1 indicates that the user clicks a file displayed on a projection interface of the mobile phone on a display of the PC, and a PC manager installed on the PC obtains click operation information of the user and responds to the click operation.

In FIG. 2, 2 indicates that the PC manager installed on the PC sends the obtained click operation information of the user to the mobile phone assistant.

In FIG. 2, 3 indicates that the mobile phone stops opening of the file. If the mobile phone determines, based on a normal process, that the user performs an operation of opening a file on the mobile phone, the mobile phone responds to the operation and opens the corresponding file. However, in the multi-screen collaboration mode, the file can be opened on only the PC but not on the mobile phone. Therefore, the mobile phone needs to stop the operation of opening the file that originally needs to be performed.

In FIG. 2, 4 indicates that the mobile phone obtains a path of the file. The path of the file herein is an absolute path of the file, that is, a storage path of the file in the mobile phone.

In FIG. 2, 5 indicates that the mobile phone assistant creates a soft link in a distributed file system (ming distributed file system, MDFS) of the mobile phone. The soft link directs to a storage path, and the storage path is the storage path of the file in the mobile phone, for example, a storage path of the file in a secure digital memory card (secure digital memory card, SD) of the mobile phone or a uniform resource locator (uniform resource locator, URL) of the file. In addition, the soft link is further associated with metadata of the file, and the metadata of the file includes, for example, a storage path of the file, and certainly may further include other content of the file, for example, type information of the file.

In FIG. 2, 6 indicates that the distributed file system of the mobile phone synchronizes the metadata of the file to a distributed file system of the PC.

In FIG. 2, 7 indicates that the mobile phone assistant obtains a path of the soft link created in the distributed file system.

In FIG. 2, 8 indicates that the mobile phone assistant sends the path of the soft link created in the distributed file system of the mobile phone to the PC manager. In addition, the mobile phone assistant can also obtain the metadata of the file, for example, the type information of the file, and the mobile phone assistant may also send the obtained metadata of the file to the PC manager.

Figure 9A:
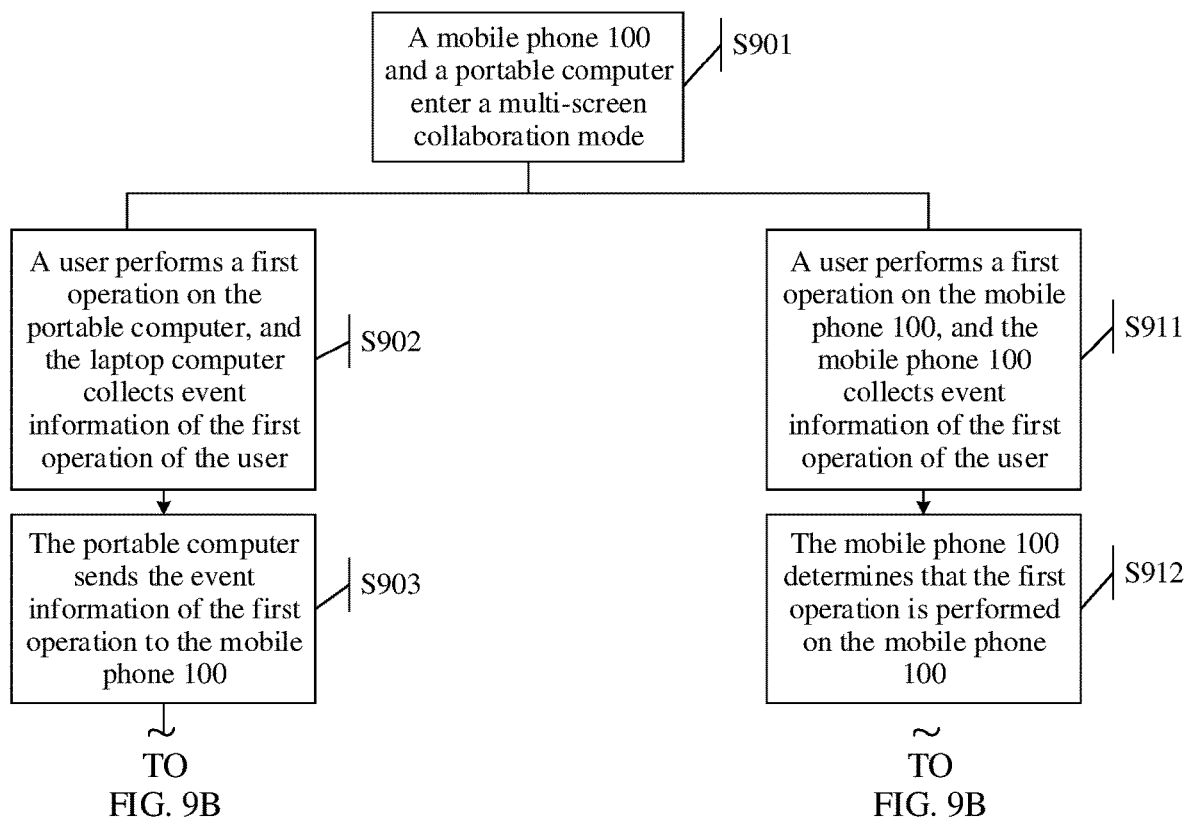
FIG. 9A and FIG. 9B are a flowchart of a second file opening method according to an embodiment of this application.
Figure 9B:
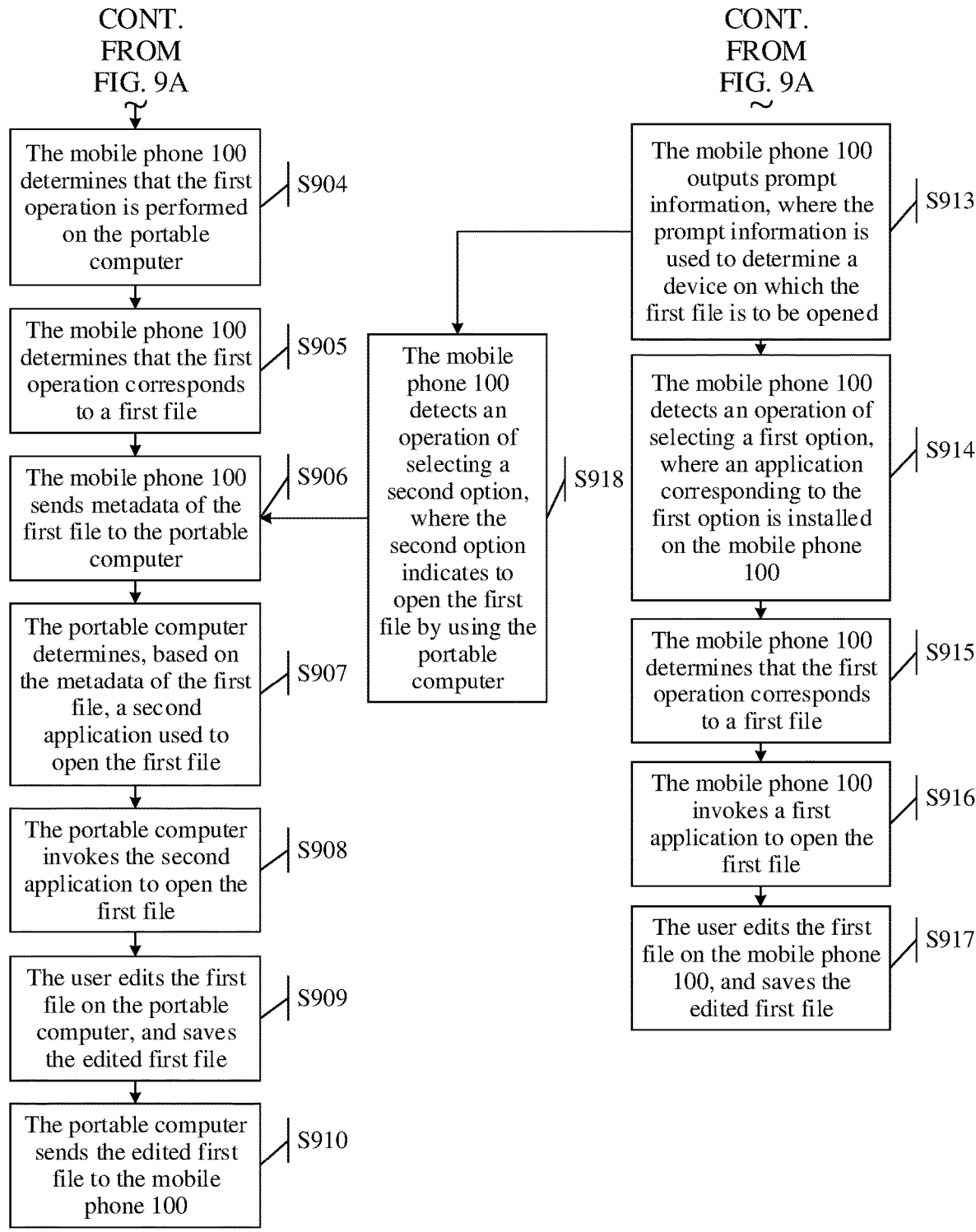
Figure 10:
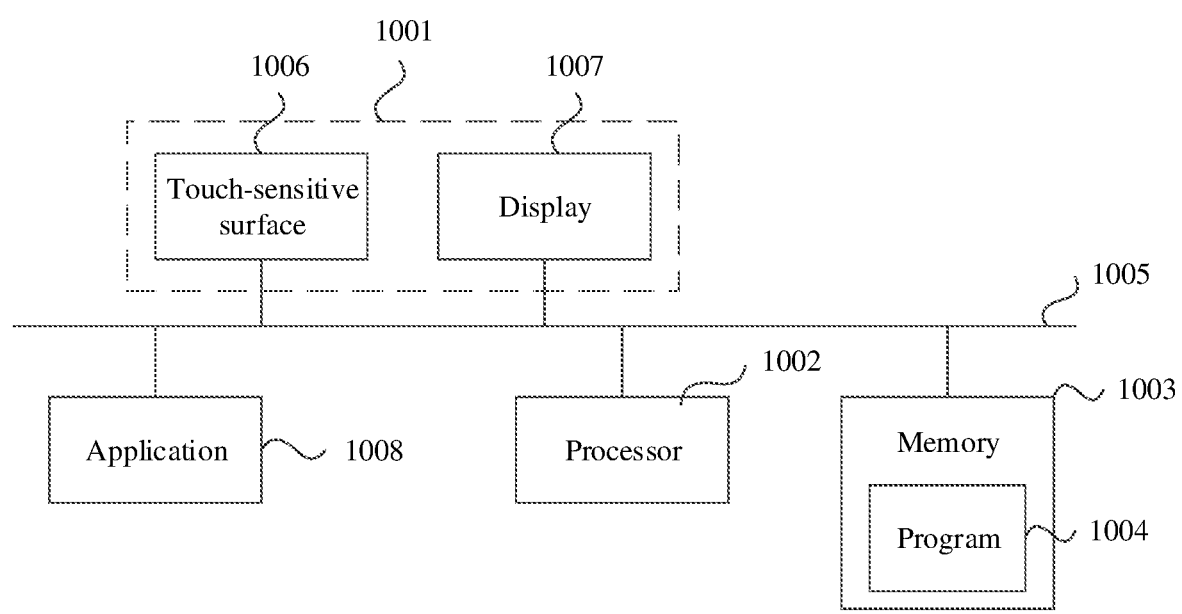
FIG. 10 is a schematic diagram of a structure of an electronic device according to an embodiment of this application.

In FIGS. 2, 9 and 10 indicate that the PC manager invokes, based on the type information of the file, an application that can open the file. In addition, the PC manager also sends the path of the soft link to the application. In FIG. 2, an example in which the application is a Microsoft Office application is used, and the application is represented as an "Office application" in FIG. 2.

In FIG. 2, 11 indicates that the Office application opens the soft link based on the path of the soft link.

In FIG. 2, 12 indicates that the distributed file system of the PC requests to obtain the file from the distributed file system of the mobile phone based on the metadata (for example, based on the storage path of the file included in the metadata) corresponding to the soft link.

In FIG. 2, 13 indicates that the distributed file system of the mobile phone reads a file that the soft link actually directs to. In addition, the distributed file system of the mobile phone sends the read file to the distributed file system of the PC, so that the Office application on the PC can open the file.

It can be learned from the foregoing process that currently, in a multi-screen collaboration (or referred to as multi-device collaboration) scenario, regardless of which device a user performs an operation on, a response is made on one of the devices participating in multi-screen collaboration. For example, during multi-screen collaboration between a mobile phone and a PC, regardless of whether a user performs an operation on the mobile phone or the PC to open a file, the file is opened on the PC but not on the mobile phone. However, if the user actually wants to view the file on the mobile phone, this cannot be implemented in the current manner. The user can normally open and view corresponding content on the mobile phone only after exiting the multi-screen collaboration mode. However, this process requires a plurality of steps, which is complex.

In view of this, in this application, the device may determine an operation focus of the user based on an operation of the user, or determine a device on which the user expects to view, to select a corresponding device according to an intention of the user to respond. In this manner, a response result can meet a user requirement, and user experience is improved. For example, when a mobile phone and a PC perform multi-screen collaboration, if a user performs an operation on the mobile phone to open a file, the file may be opened on the mobile phone; or if the user performs an operation on the PC to open a file, the file may be opened on the PC. It can be learned that the user can open and view corresponding content on the mobile phone without exiting the multi-screen collaboration mode. This simplifies an operation process of the user. The device does not need to respond for a plurality of times, and this helps reduce power consumption of the device.

The following describes the technical solutions provided in embodiments of this application.

In embodiments of this application, the first device and the second device need to perform multi-screen collaboration. For ease of understanding, in the following description process, an example in which the first device is a mobile phone and the second device is a portable computer is used. A structure of the mobile phone is, for example, the structure shown in FIG. 1. In view of this, the electronic device 100 shown in FIG. 1 may also be referred to as a mobile phone 100. In addition, the first device needs to implement a multi-screen collaboration function, for example, by using first manager software installed on the first device. The second device needs to implement multi-screen collaboration, for example, by using second manager software installed on the second device. It can be learned from the foregoing descriptions that the first manager software may be a software module that runs independently on the first device, or may be a part of system software of the first device. The second manager software may be a software module that runs independently on the second device, or may be a part of system software of the second device. In addition, "projection software" may also have another name, for example, may also be referred to as a "projection application (APP)". If the first device is the mobile phone 100, the first manager software may also be referred to as a mobile phone assistant or the like. It should be understood that the manager software may also be referred to as another name. The word "manager" does not have a specific meaning, and does not mean that the manager software definitely needs to manage other software on a device in which the manager software is located.

In addition, in embodiments of this application, a software module and an application (APP) may be a same concept. For example, a mobile phone assistant is a software module, and is also an application. Therefore, "software" may be replaced with "application (APP)". For example, "manager software" may also be referred to as a "manager application", and "projection software" may also be referred to as a "projection application". Alternatively, the application may include one or more software modules, but the software module cannot be considered as an application. For example, a manager software is a software module, but is not an independent application. It may be considered that the manager software is a software module set in a corresponding application (for example, a manager application), or may be a software module set in system software. Similarly, a projection software is a software module, but is not an independent application. It may be considered that the projection software is a software module set in a corresponding application (for example, a projection application), or may be a software module set in system software. An "application" is an icon that can be directly invoked by a user. For example, icons such as "Messages" and "Application market" displayed on a display interface of the mobile phone represent corresponding applications. In the following description process, an example in which a software module and an application are a same concept is used.

Figure 3A:
FIG. 3A is a schematic diagram of a home screen of a mobile phone according to an embodiment of this application.
Figure 3B:
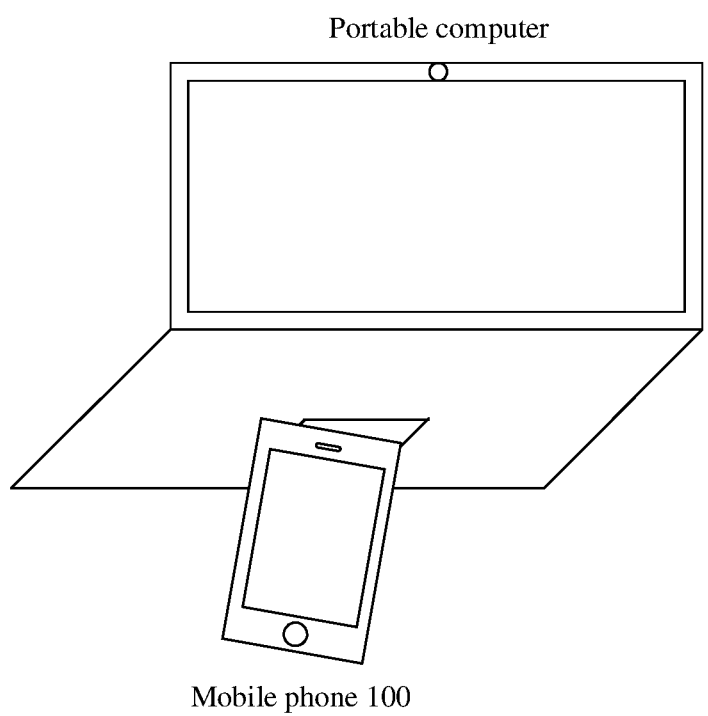
FIG. 3B is a schematic diagram in which a user touches a portable computer by using a mobile phone according to an embodiment of this application.

FIG. 3A shows a GUI of the mobile phone 100. The GUI is a home screen 201 of the mobile phone. If a user expects that the mobile phone 100 and the portable computer perform multi-screen collaboration, the user needs to enable both the mobile phone 100 and the portable computer to enter a multi-screen collaboration mode. A preset manner may be used to enable the mobile phone 100 and the portable computer to enter the multi-screen collaboration mode, and the preset manner may include a plurality of operation manners. For example, as shown in FIG. 3B, the user may hold the mobile phone 100 to tap the portable computer, for example, tap an NFC area of the portable computer. In this case, the mobile phone 100 and the portable computer may establish an NFC connection, and both enter the multi-screen collaboration mode. In this case, the preset manner is the "OneHop" manner. That is, the user needs to perform only one operation (a tap operation), so that a connection can be established between the two devices, and the two devices can enter the multi-screen collaboration mode. FIG. 3B mainly shows a process in which the mobile phone 100 taps the portable computer. Therefore, a display interface of the mobile phone 100 is not drawn in detail.

Alternatively, the user may enable a Bluetooth function on the mobile phone 100 and the portable computer. For example, after the Bluetooth function is enabled, the mobile phone 100 scans surrounding Bluetooth devices. If the mobile phone 100 finds the portable computer through scanning, the mobile phone 100 and the portable computer may establish a Bluetooth connection, and both enter the multi-screen collaboration mode. In this case, the preset manner is a manner in which the user enables the Bluetooth function, or a manner in which the mobile phone 100 scans the portable computer. That is, the user needs to perform only one operation (an operation of enabling the Bluetooth function), so that a connection can be established between the two devices, and the two devices can enter the multi-screen collaboration mode. Alternatively, the user enables the Bluetooth function on the mobile phone 100 and the portable computer. For example, after the Bluetooth function is enabled, the mobile phone 100 scans surrounding Bluetooth devices. If the mobile phone 100 finds the portable computer through scanning, the mobile phone 100 and the portable computer may establish a Bluetooth connection. After the mobile phone 100 and the portable computer establish the Bluetooth connection, the user performs a corresponding operation, so that the mobile phone 100 and the portable computer enter the multi-screen collaboration mode. For example, second projection software is installed on the portable computer, and first projection software is installed on the mobile phone 100. The operation performed by the user is, for example, an operation of scanning, by using the first projection software, a two-dimensional code provided by the second projection software, and the operation performed by the user is considered as a preset manner. That is, the user needs to perform at least two operations, so that the two devices establish a connection and enter the multi-screen collaboration mode.

Alternatively, the mobile phone 100 and the portable computer may establish a connection through Wi-Fi or in another manner, and enter the multi-screen collaboration mode.

Alternatively, the second projection software is installed on the portable computer, and the first projection software is installed on the mobile phone 100. The first projection software and the second projection software may be of two different types, or may be of a same type, but are installed on different devices. It can be learned from the foregoing description that the first projection software may be a software module that runs independently on the mobile phone 100, or may be a part of system software of the mobile phone 100. The second projection software may be a software module that runs independently on the portable computer, or may be a part of system software of the portable computer. It should be understood that the "projection software" may also have another name, for example, may be referred to as a "projection application". In addition, the projection software and the manager software may be a same software module. For example, the first projection software and the first manager software may be a same software module, and the second projection software and the second manager software may be a same software module. Alternatively, the projection software and the manager software may be different software modules. For example, the first projection software and the first manager software may be different software modules, and the second projection software and the second manager software may be different software modules. For example, the first projection software is a part of the system software of the mobile phone 100, and the first manager software is a software module that runs independently on the mobile phone 100 and does not belong to the system software. In this case, it is considered that the first projection software and the first manager software are different software modules. For another example, both the first projection software and the first manager software are software modules that run independently on the mobile phone 100, but are different software modules. In this case, it is also considered that the first projection software and the first manager software are different software modules. The user may open the second projection software on the portable computer and also open the first projection software on the mobile phone 100. The second projection software on the portable computer may provide a two-dimensional code. The user may use the mobile phone 100 to scan, by using the first projection software on the mobile phone 100, the two-dimensional code provided by the second projection software on the portable computer, so that the mobile phone 100 and the portable computer can establish a connection and both enter the multi-screen collaboration mode. Alternatively, an operation of scanning, by the user by using the first projection software on the mobile phone 100, the two-dimensional code provided by the second projection software on the portable computer only enables the two devices to enter the multi-screen collaboration mode, and the two devices have established a connection before, for example, a Bluetooth connection or a Wi-Fi connection.

Alternatively, the user may log in to a same account on the second projection software of the portable computer and the first projection software of the mobile phone 100, for example, enter a same account and password on the second projection software of the portable computer and the first projection software of the mobile phone 100. In this way, the mobile phone 100 and the portable computer can establish a connection and enter the multi-screen collaboration mode without scanning the two-dimensional code. The preset manner is an operation manner of entering a same account and password by the user on the second projection software of the portable computer and the first projection software of the mobile phone 100. Alternatively, an operation of entering a same account and password by the user on the second projection software of the portable computer and the first projection software of the mobile phone 100 only enables the two devices to enter the multi-screen collaboration mode, and the two devices have established a connection before, for example, a Bluetooth connection or a Wi-Fi connection.

If the first projection software is installed on the mobile phone 100, the first manager software can capture an operation performed by the user on the first projection software, and the first manager software can send, to the first projection software, an instruction from the portable computer (or from the second manager software). Similarly, if the second projection software is installed on the portable computer, the second manager software can capture an operation performed by the user on the second projection software, and the second manager software can send, to the second projection software, an instruction from the mobile phone 100 (or from the first manager software).

Alternatively, the user may use another manner to enable both the mobile phone 100 and the portable computer to enter the multi-screen collaboration mode. A specific manner is not limited.

Figure 3C:
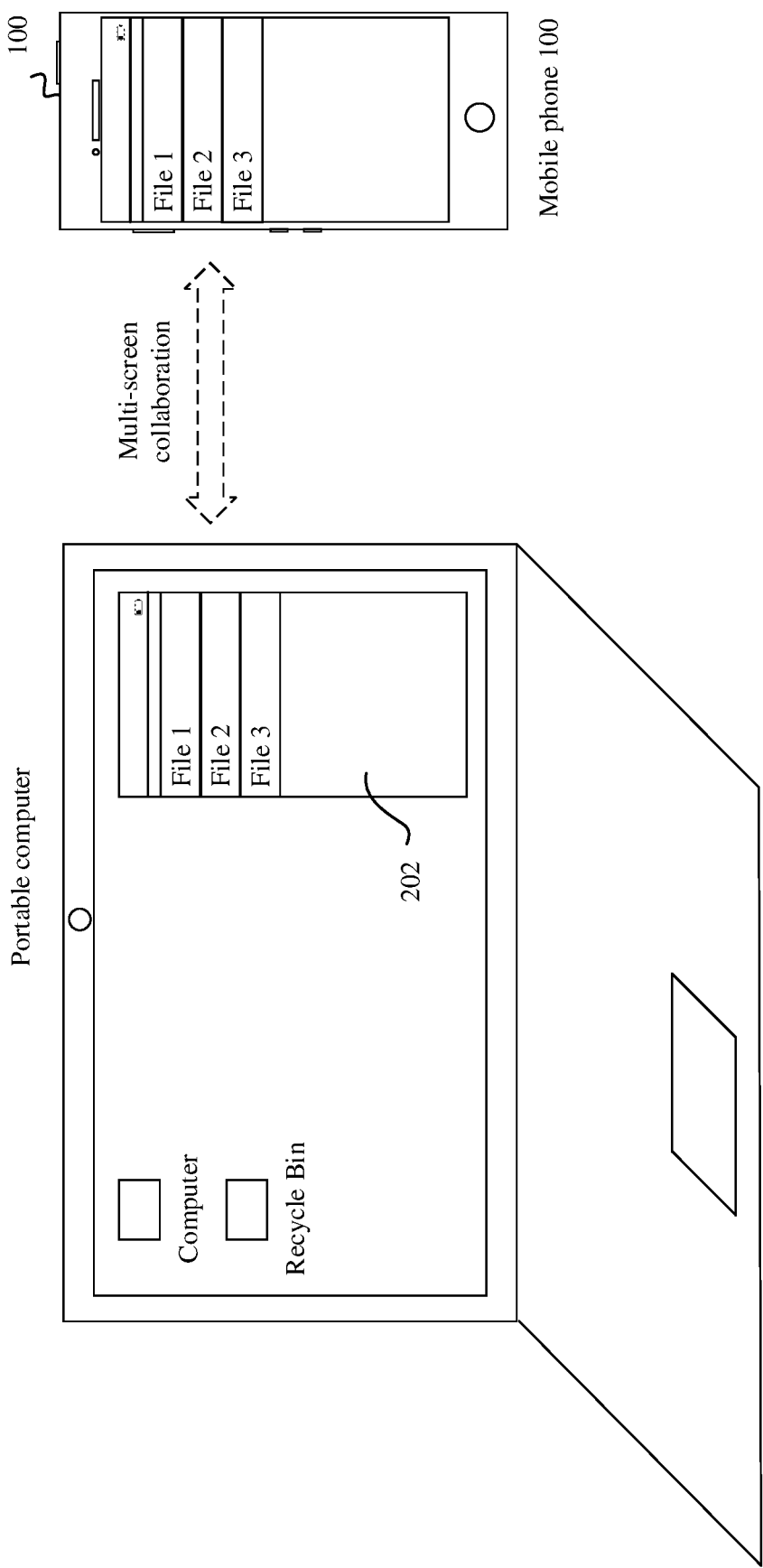
FIG. 3C is a schematic diagram of displaying a mirror of a mobile phone on a portable computer in a multi-screen collaboration mode according to an embodiment of this application.

In addition, as shown in FIG. 3C, in the multi-screen collaboration mode, a display of the portable computer displays a current display interface 202 of the mobile phone 100. The display interface 202 may also be referred to as a projection interface 202 or a screen recording interface 202. The projection interface 202 is a mirror of a display interface of the mobile phone 100. The projection interface 202 displayed on the portable computer and the display interface of the mobile phone 100 are from a same source, that is, both from the mobile phone 100. For example, the mobile phone 100 sends information about the display interface of the mobile phone to the portable computer, so that the portable computer can display the projection interface 202 at a scale that is the same as a size of a display of the mobile phone 100. After the portable computer displays the projection interface 202, the user may also perform an operation such as scaling up or scaling down on the projection interface 202, to change a size of the projection interface 202, or the user may further perform an operation such as dragging on the projection interface 202, to change a position of the projection interface 202 on the display of the portable computer.

After both the mobile phone 100 and the portable computer enter the multi-screen collaboration mode, according to the technical solution provided in this application, the user may choose to view content on the mobile phone on the portable computer side. The display of the portable computer is larger, and viewing on a large screen can bring better viewing experience to the user. Alternatively, the user may choose to view the content on the mobile phone on the mobile phone side. The mobile phone is more portable, and can meet a requirement of viewing at any time. The following describes how to select a device for viewing.

Figure 4A:
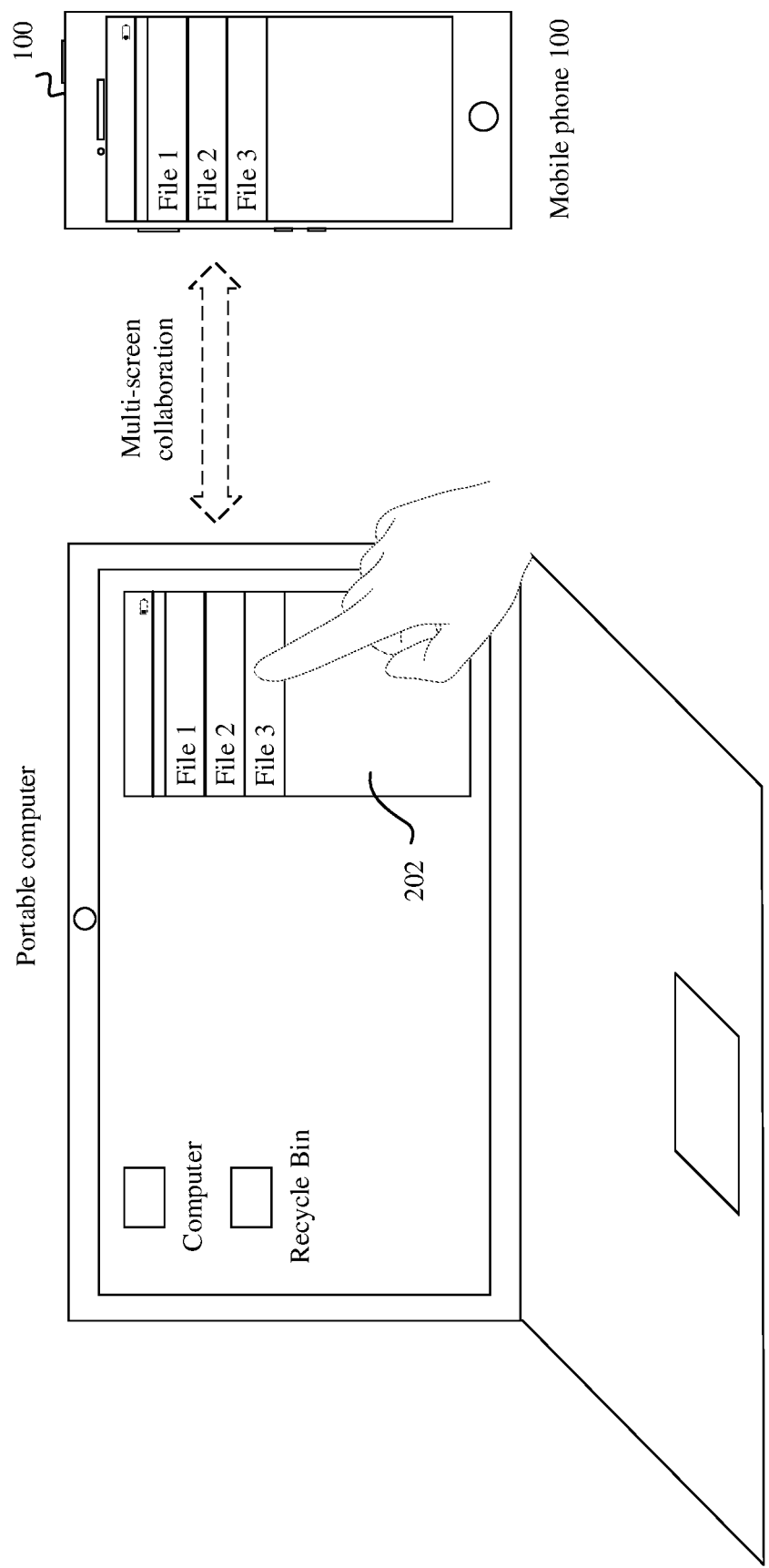
FIG. 4A is a schematic diagram in which a user performs a first operation on a projection interface 202 displayed on a portable computer according to an embodiment of this application.

For example, the user performs a first operation on the projection interface 202 displayed on the portable computer. The first operation is, for example, a touch operation. As shown in FIG. 4A, the first operation is an operation of touching a file icon "file 3" on the projection interface 202 by the user by using a finger. This indicates that the user wants to open a file 3. A touch sensor on the display of the portable computer may collect (or capture) event information of the first operation. In other words, the touch sensor on the display of the portable computer may capture the first operation of the user, and obtain the event information corresponding to the first operation, where the event information may indicate the first operation. Because an area for which the first operation is performed is the projection interface 202, the touch sensor may send the collected event information of the first operation to the second manager software. The event information of the first operation includes, for example, an identifier of the portable computer, and optionally, may further include position information of the first operation. The position information of the first operation is, for example, relative position information of the first operation on the projection interface 202. In this way, even if the projection interface 202 is in a different position on the display of the portable computer, the relative position information of the first operation remains unchanged. For the mobile phone 100, the file corresponding to the first operation may be determined based on an area conversion ratio between the display 194 of the mobile phone 100 and the projection interface 202 and the relative position information of the first operation.

Alternatively, the first operation may also be another operation such as a voice control operation, a gesture operation, or a pressing operation performed on the display of the portable computer. In this case, the first operation is collected by using a different sensor in the portable computer. A type of the first operation is not limited in embodiments of this application.

The second manager software sends the event information of the first operation to the first manager software. A sending manner depends on a connection manner between the mobile phone 100 and the portable computer, for example, NFC, Bluetooth, Wi-Fi, or a mobile network. After the first manager software receives the event information of the first operation, because the event information of the first operation includes the identifier of the portable computer, the first manager software determines that the event information of the first operation corresponds to the portable computer, that is, determines that the first operation is an operation performed on the portable computer. In other words, the first manager software determines that a file icon (for example, the file icon "file 3") corresponding to the first operation is located on the display interface of the portable computer. In this case, the first manager software may determine a storage path of the file corresponding to the first operation. For example, if the event information of the first operation includes the relative position information of the first operation on the projection interface 202, the first manager software may determine the file such as the file 3 corresponding to the first operation based on the area conversion ratio between the projection interface 202 and the display 194 of the mobile phone 100 and the relative position information of the first operation, so that the first manager software can determine a storage path of the file 3. The first manager software may create a soft link corresponding to the file in a distributed file system of the mobile phone 100. The soft link directs to the storage path of the file. For example, the soft link directs to a storage path of the file in an SD card of the mobile phone or a URL of the file. In addition, the soft link is associated with metadata of the file. The distributed file system of the mobile phone 100 may synchronize the metadata of the file corresponding to the first operation to a distributed file system of the portable computer.

Metadata of a file may also be referred to as description information of the file. The metadata of the file includes, for example, a storage path of the file. Optionally, the metadata may further include one or more of the following: a name of the file, type information of the file, or size information of the file. For example, metadata of a file may include storage path information of the file; or metadata of a file may include type information of the file and storage path information of the file; or metadata of a file may include size information of the file, a name of the file, and storage path information of the file. A storage path indicated by storage path information of a file may be a storage path of the file in the mobile phone 100. In the foregoing example, the file corresponding to the first operation is the file 3, and the distributed file system of the mobile phone 100 may synchronize metadata of the file 3 to the distributed file system of the portable computer.

The first manager software may obtain a path of the soft link created in the distributed file system of the mobile phone 100, and the first manager software may send the path of the soft link to the second manager software. In addition, the first manager software can also obtain the metadata of the file, for example, the type information of the file, and the first manager software may also send the obtained metadata of the file to the second manager software.

The second manager software determines and invokes, based on the type information of the file and the like, an application that can open the file. For example, the second manager software determines that a second application can open the file. In embodiments of this application, if the two nouns "software" and "application" can be exchanged, the "second application" may also be referred to as "second software"; or if "software" and "application" are not concepts at a same level and cannot be exchanged, it may be considered that one or more software modules are set in the second application. For example, if type information of the file 3 indicates that the file 3 is of an image type, the second manager software may determine that an image application can open the file 3. For another example, if the type information of the file 3 indicates that the file 3 is a Microsoft Word document, the second manager software may determine that a Microsoft Office Word application can open the file 3. In addition, the second manager software also sends the path of the soft link to the second application.

The second application opens the soft link based on the path of the soft link. In this case, the distributed file system of the portable computer may obtain the file 3 from the mobile phone 100 based on the metadata corresponding to the soft link. This may be understood as obtaining data of the file 3 from the mobile phone 100. For example, the distributed file system of the portable computer may obtain the file 3 from the mobile phone 100 based on storage path information of the file 3 included in the metadata corresponding to the soft link. Therefore, the second application can open the file 3.

Figure 4B:
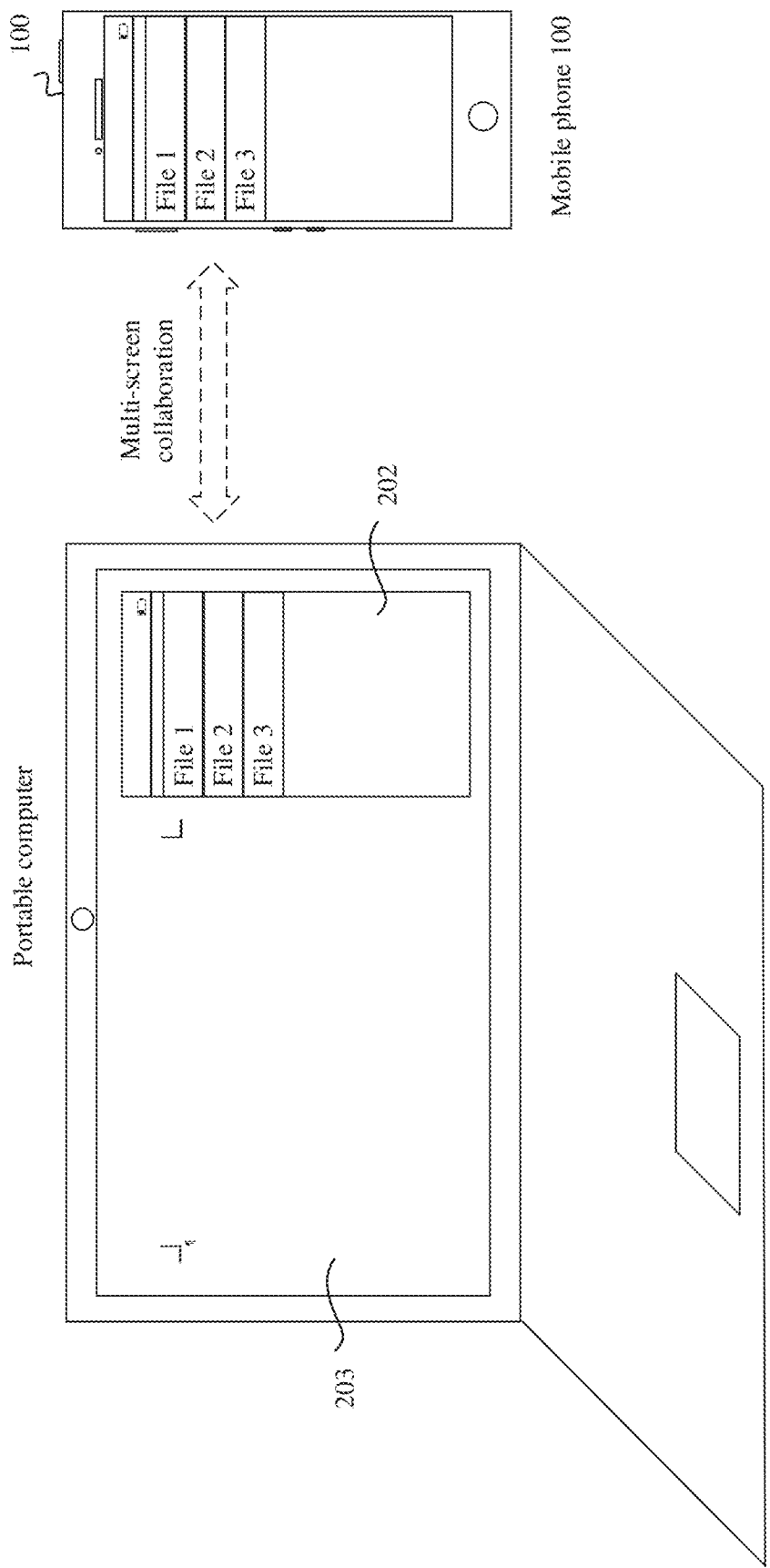
FIG. 4B is a schematic diagram of opening a file 3 on a portable computer according to an embodiment of this application.
Figure 4C:
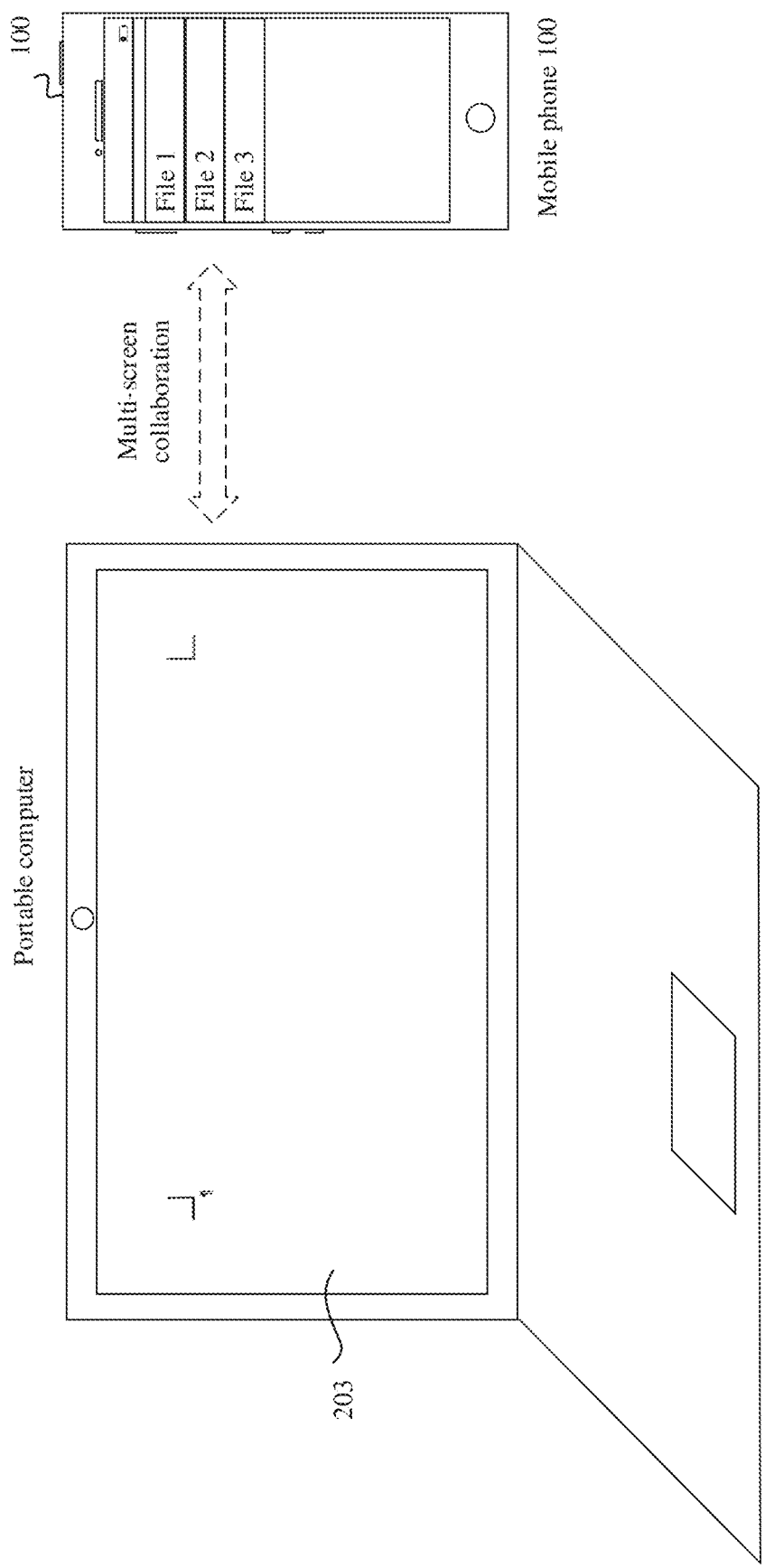
FIG. 4C is another schematic diagram of opening a file 3 on a portable computer according to an embodiment of this application.
Figure 4D:
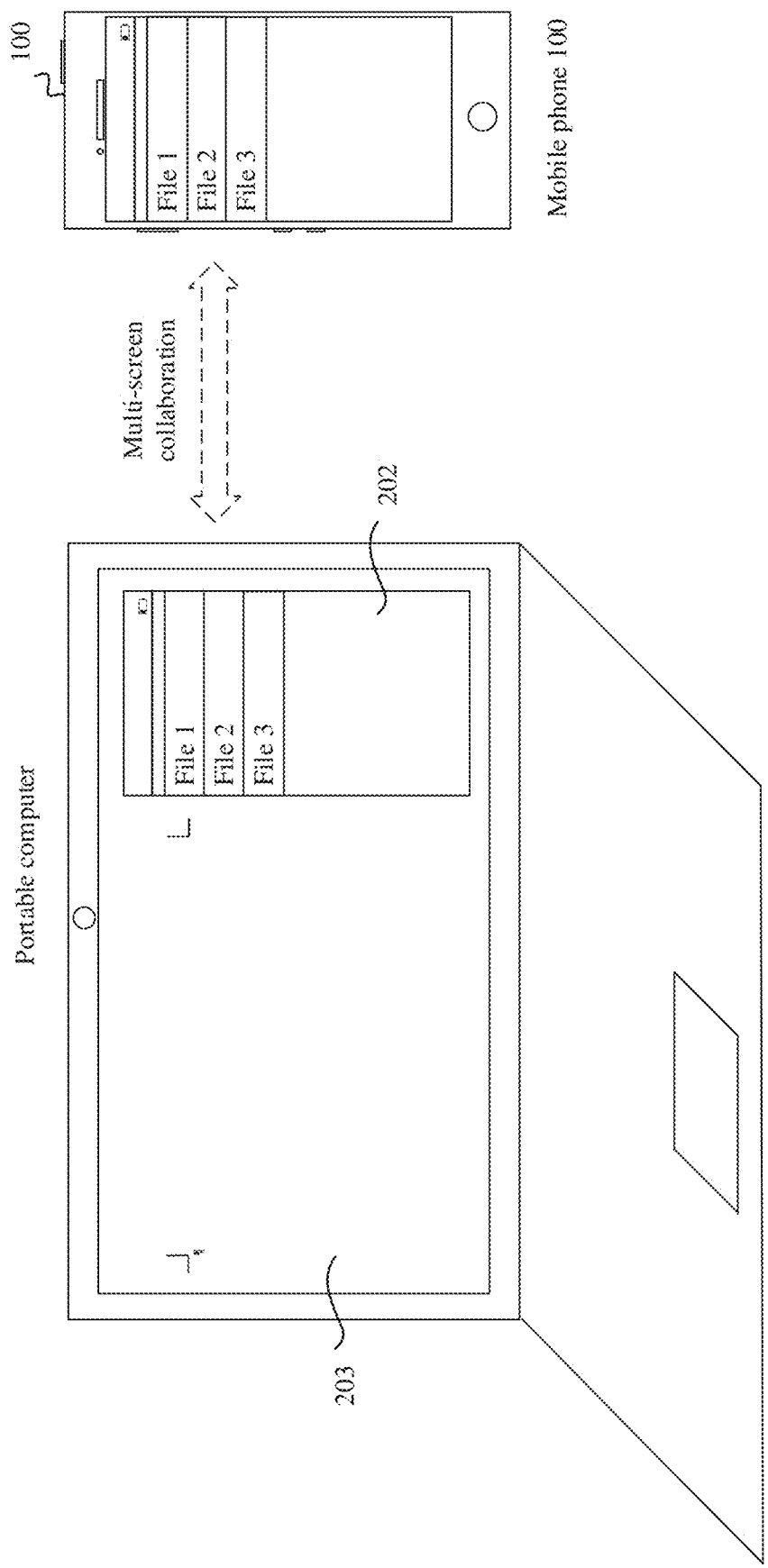
FIG. 4D is still another schematic diagram of opening a file 3 on a portable computer according to an embodiment of this application.

FIG. 4B is a schematic diagram of opening the file 3 on the portable computer. An interface 203 in FIG. 4B represents an interface of the file 3 opened on the portable computer. In FIG. 4B, an example in which the file 3 is a word file is used. After the file is opened on the portable computer, the user may adjust a size of the interface 203. As shown in FIG. 4B, the interface 203 and the projection interface 202 may be displayed together. Alternatively, the interface 203 may cover the projection interface 202, as shown in FIG. 4C. Alternatively, the user may set the projection interface 202 to "pin to top", and a part or all of an area of the projection interface 202 may also be located on the interface 203, as shown in FIG. 4D.

In this manner, if the file 3 is opened on the portable computer, the file 3 is not opened on the mobile phone 100.

In addition, the portable computer may further store the data of the file 3 in the portable computer. For example, the portable computer may store the data of the file 3 in a local file system of the portable computer by using the second application, for example, may store the data of the file 3 as a temporary file.

The user may view the file 3 on the portable computer by using the second application, or the user may perform an editing operation on the file 3 on the portable computer by using the second application, for example, may delete content, add content, or modify content in the file 3. After the user completes an operation on the file 3, the file 3 may be saved, and the portable computer may update the stored data of the file 3, to obtain updated data of the file 3. The updated data of the file 3 may be understood as an updated file 3. This is equivalent to a process in which the portable computer uses the updated data of the file 3 to overwrite the original data of the file 3 stored in the portable computer. The portable computer may send the updated data of the file 3 to the mobile phone 100. For example, the portable computer may synchronize a second file to the distributed file system of the mobile phone 100 by using the distributed file system of the portable computer. In this case, the mobile phone 100 may use the updated data of the file 3 to overwrite the original data of the file 3 stored in a local file system of the mobile phone 100. In this way, the file 3 is updated. The portable computer may send the updated data of the file 3 to the mobile phone 100 each time after the user updates the file 3, so that the file 3 can be updated in time on the mobile phone side. Alternatively, the portable computer may send the updated data of the file 3 to the mobile phone 100 after the user closes the file 3, to reduce a quantity of times of sending the updated data, and reduce transmission overheads. In addition, after the portable computer sends the updated data of the file 3 to the mobile phone 100, the portable computer may delete the stored updated data of the file 3. For example, the portable computer may delete the temporary file to release storage space.

The foregoing describes a process in which the user performs an operation on the portable computer in the multi-screen collaboration mode. Alternatively, in the multi-screen collaboration mode, the user may still perform an operation on the mobile phone 100. For example, the user may be in a moving state, and it is more convenient to use the mobile phone 100 in a moving process; or the user is far away from the portable computer, and it is more convenient for the user to use the mobile phone 100 nearby. The following describes how the devices respond when the user performs an operation on the mobile phone.

Figure 5A:
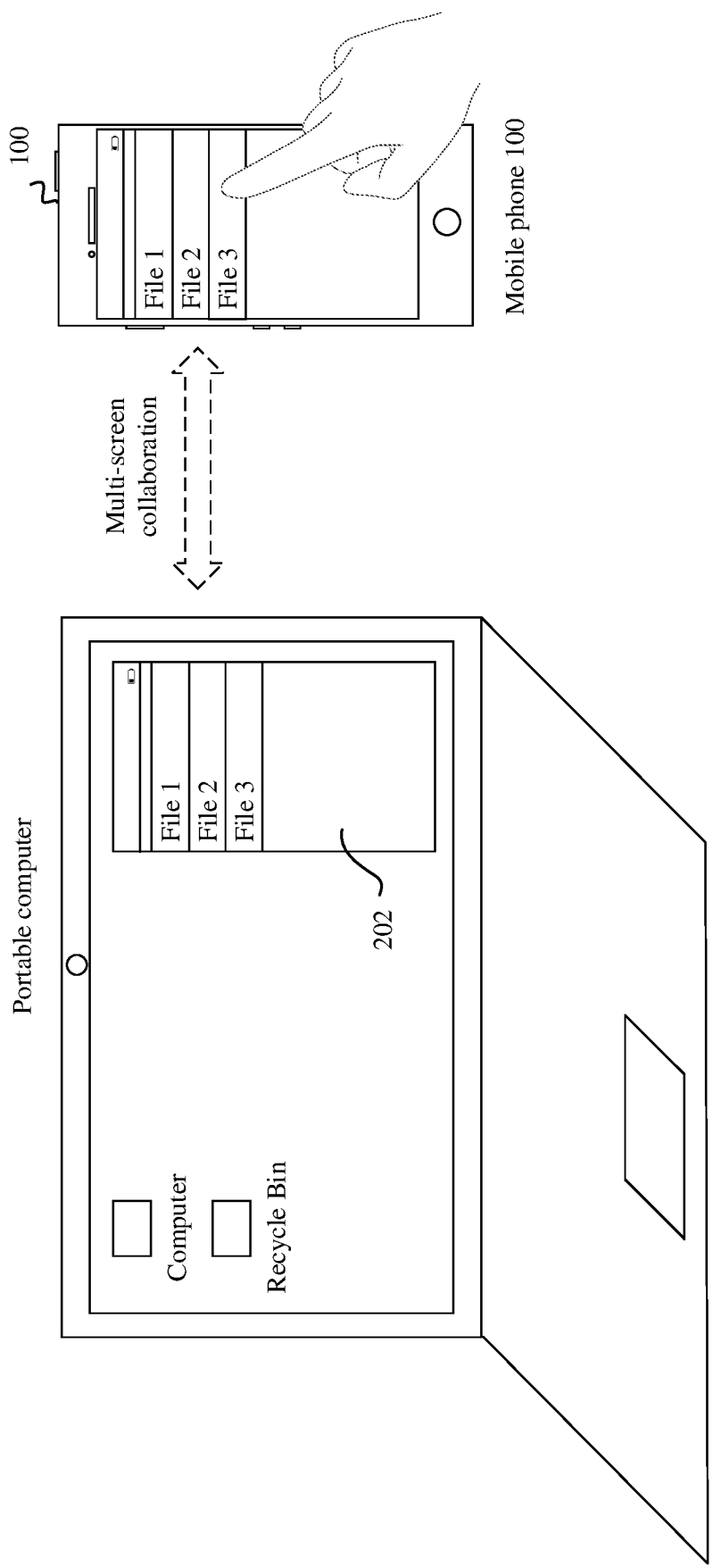
FIG. 5A is a schematic diagram in which a user performs a second operation on a mobile phone 100 according to an embodiment of this application.

For example, the user performs a second operation (or may also be referred to as a first operation) on the mobile phone 100. The second operation is, for example, a touch operation. As shown in FIG. 5A, the second operation is an operation of touching a file icon "file 3" on the display interface of the mobile phone by the user by using a finger. This indicates that the user wants to open the file 3. The touch sensor 180K on the display 194 of the mobile phone 100 may collect (or detect) event information of the second operation. In other words, the touch sensor 180K on the display 194 of the mobile phone 100 may capture the second operation, and obtain the event information of the second operation, where the event information of the second operation may indicate the second operation. The touch sensor 180K may send the collected event information of the second operation to the first manager software. The event information of the second operation includes, for example, an identifier of the mobile phone 100, and optionally, may further include position information and the like of the second operation. The position information of the second operation is, for example, absolute position information of the second operation on the display 194.

After the first manager software obtains the event information of the second operation, because the event information of the second operation includes the identifier of the mobile phone 100, for example, from the touch sensor 180K, the first manager software may determine that the event information of the second operation corresponds to the mobile phone 100, that is, determines that the second operation is an operation performed on the mobile phone 100. In other words, the first manager software determines that a file icon (for example, the file icon "file 3") corresponding to the second operation is located on the display interface of the mobile phone 100. In this case, the first manager software may determine the file such as the file 3 corresponding to the second operation based on the position information of the second operation, and then the first manager software may determine, based on the type of the file 3, an application that can open the file 3, for example, the first application. In embodiments of this application, if the two nouns "software" and "application" can be exchanged, the "first application" may also be referred to as "first software"; or if "software" and "application" are not concepts at a same level and cannot be exchanged, it may be considered that one or more software modules are set in the first application. The second application described above and the first application herein may be a same application, for example, both are a Microsoft Office Word application, but have different names because the applications are installed on different devices. Alternatively, the first application and the second application may be different applications. For example, the first application is a Microsoft Office Word application, and the second application is a WPS Office Word application, but both the first application and the second application can open files of a same type.

Figure 5B:
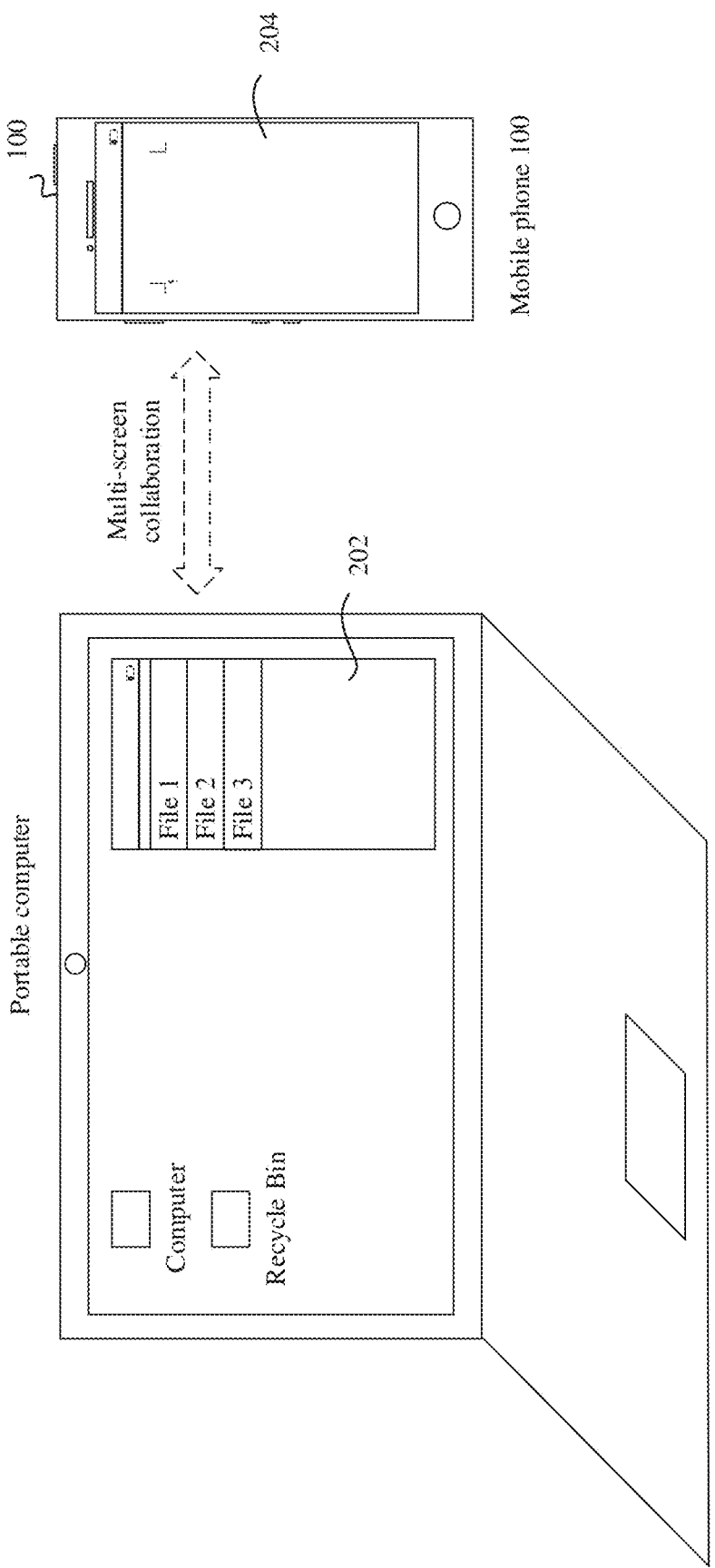
FIG. 5B is a schematic diagram of opening a file 3 on a mobile phone 100 according to an embodiment of this application.

Then, the first manager software may open, on the mobile phone 100 by using the first application, the file 3 stored in the local file system of the mobile phone 100. FIG. 5B is a schematic diagram of opening the file 3 on the mobile phone 100. An interface 204 in FIG. 5B indicates an interface of the file 3 opened on the display 194 of the mobile phone 100. After a file is opened on the mobile phone 100, the user may adjust a size of the interface 204.

In this manner, if the file 3 is opened on the mobile phone 100, the file 3 is not opened on the portable computer.

The user may view the file 3 on the mobile phone 100 by using the first application, or the user may perform an editing operation on the file 3 on the mobile phone 100 by using the first application, for example, may delete content, add content, or modify content in the file 3. After the user completes an operation on the file 3, the file 3 may be saved, and the mobile phone 100 may update data of the file 3 stored in the local file system of the mobile phone 100.

Figure 6:
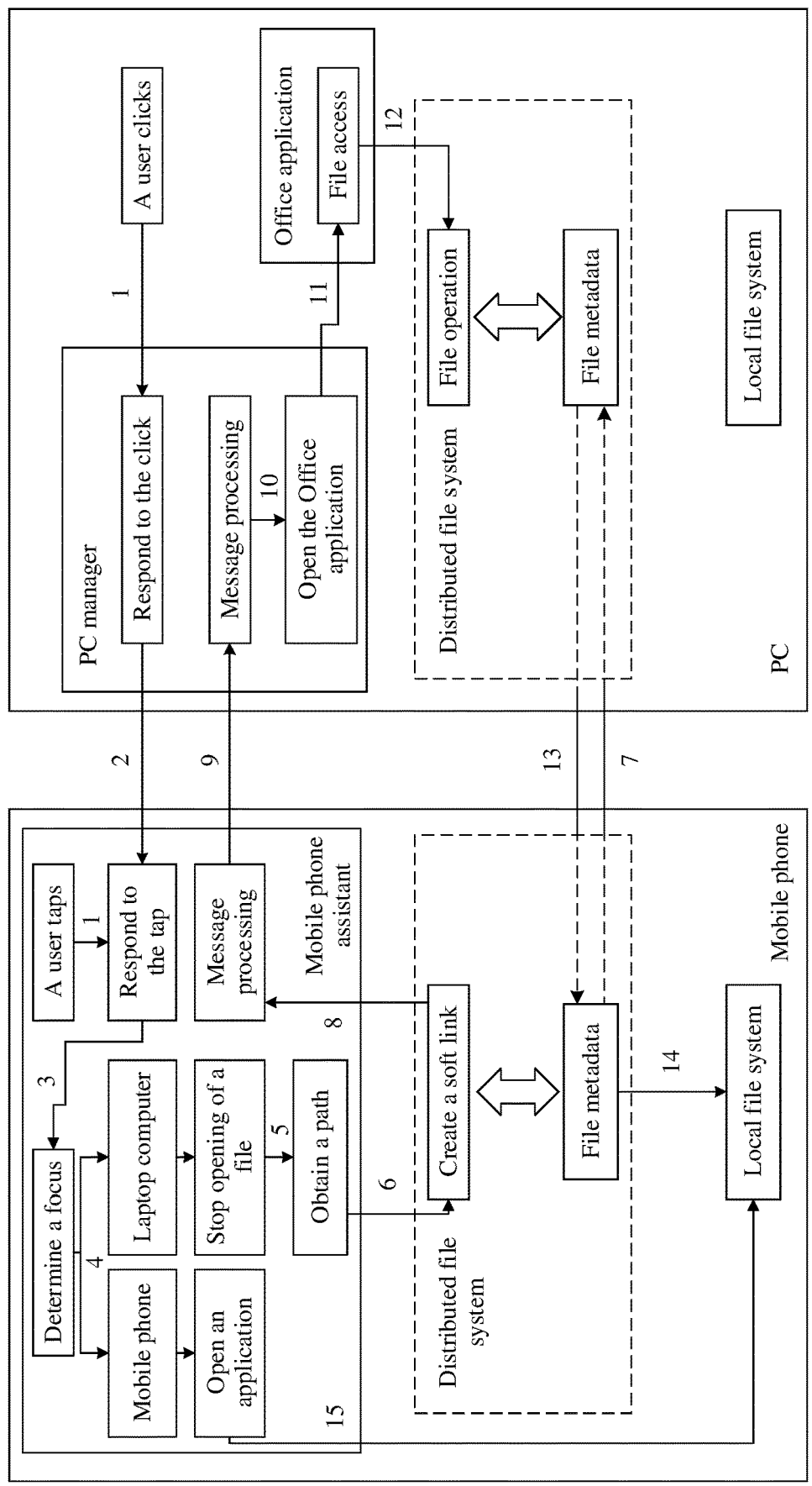
FIG. 6 is a schematic diagram of a process of opening a file in a multi-screen collaboration mode according to an embodiment of this application.

FIG. 6 is a schematic diagram of a process of opening a file in the multi-screen collaboration mode after the method provided in the foregoing embodiment of this application is used.

In FIG. 6, 1 indicates that a user taps a file displayed on the display interface of the mobile phone 100, and the first manager software (for example, a mobile phone assistant in FIG. 6) installed on the mobile phone 100 obtains tap operation information of the user, and responds to the tap. Alternatively, in FIG. 6, 1 indicates that the user clicks a file displayed on the projection interface 202 of the mobile phone on the display of the portable computer, and the second manager software (for example, a PC manager in FIG. 6) installed on the portable computer obtains click operation information of the user, and responds to the click.

In FIG. 6, 2 indicates that the second manager software sends the obtained click operation information of the user to the first manager software.

In FIG. 6, 3 indicates that the first manager software performs focus determining, that is, determines a position of an operation focus of the user. In embodiments of this application, for example, the first manager software may determine the focus of the user based on a parameter of a tap response. For example, if the tap operation information is sent by the second manager software, the first manager software may set a value of the parameter of the tap response to a first value when responding to the tap. If the tap operation information is sent by a sensor (for example, the touch sensor 180K) in the mobile phone 100, the first manager software may set a value of the parameter of the tap response to a second value when responding to the tap. In this way, when determining the focus, the first manager software can determine, based on different values of the parameter of the tap operation, a device on which the operation of the user is performed, or a device on which the operation focus of the user is located.

In FIG. 6, 4 indicates that the first manager software performs different processing based on a focus determining result.

If the first manager software determines that the operation focus of the user is located on the portable computer, the first manager software may stop opening of the file. This is because the operation focus of the user is located on the portable computer, and therefore the file needs to be opened on the portable computer, and the file is not opened on the mobile phone 100. Therefore, the mobile phone 100 needs to stop an operation that is used to open the file and that originally needs to be performed.

In FIG. 6, 5 indicates that the first manager software obtains a path of the file. The path of the file herein is an absolute path of the file, that is, a storage path of the file in the mobile phone 100.

In FIG. 6, 6 indicates that the first manager software creates a soft link in the distributed file system in the mobile phone. The soft link directs to a first storage path, and the first storage path is a storage path of the file in the mobile phone, for example, a storage path of the file in an SD of the mobile phone or a URL of the file. In addition, the soft link is further associated with metadata of the file, and the metadata of the file includes, for example, a storage path of the file, and optionally, may further include type information of the file.

In FIG. 6, 7 indicates that the distributed file system of the mobile phone 100 synchronizes the metadata of the file to the distributed file system of the portable computer.

In FIG. 6, 8 indicates that the first manager software obtains a path of the soft link created in the distributed file system of the mobile phone 100.

In FIG. 6, 9 indicates that the first manager software sends, to the second manager software, the path of the soft link created in the distributed file system of the mobile phone 100. In addition, the first manager software can also obtain the metadata of the file, for example, the type information of the file, and the first manager software may also send the obtained metadata of the file to the second manager software.

In FIGS. 6, 10 and 11 indicate that the second manager software invokes, based on the type information of the file, an application that can open the file. In addition, the second manager software also sends the path of the soft link to the application. In FIG. 6, an example in which the application is a Microsoft Office application is used.

In FIG. 6, 12 indicates that the Office application opens the soft link based on the path of the soft link.

In FIG. 6, 13 indicates that the distributed file system of the portable computer requests to obtain the file from the distributed file system of the mobile phone 100 based on the metadata (for example, based on the storage path of the file included in the metadata) corresponding to the soft link.

In FIG. 6, 14 indicates that the distributed file system of the mobile phone 100 reads a file that the soft link actually directs to. For example, the distributed file system of the mobile phone 100 reads the file from the local file system of the mobile phone 100. In addition, the distributed file system of the mobile phone 100 further sends the read file to the distributed file system of the portable computer, so that the Office application on the portable computer can open the file. In addition, the portable computer may further store the data of the file 3 in the portable computer. For example, the portable computer may store the data of the file 3 in the local file system of the portable computer by using the second application, for example, may store the data as a temporary file. The user may perform an operation such as content modifying, deleting, or adding on the file 3 by using the second application on the portable computer, and the temporary file stored in the local file system of the portable computer may be updated. After the update, the portable computer may send an updated file to the mobile phone 100, so that the mobile phone 100 can update, based on the updated file, the original file stored in the local file system of the mobile phone 100.

5 to 14 in FIG. 6 describe how to open a file on the portable computer. Alternatively, if the first manager software determines that the operation focus of the user is on the mobile phone 100, the mobile phone 100 may invoke an application that can open the file, for example, the first application. Then, with reference to 15 in FIG. 6, the first application opens the file based on the storage path of the file in the local file system of the mobile phone 100.

For a same file in the first device, after the method provided in embodiments of this application is used, final experience effects of an operation on the first device and an operation in a collaboration window (for example, the projection interface 202) mirrored by the first device to the second device are different. Even in a multi-screen collaboration scenario, the first device may intelligently select a device based on a current focus of the user (for example, a device on which the operation of the user is performed), to open, edit, and save a corresponding file, the user can complete office work without leaving or switching the current focused screen, to provide better preview and editing experience for the user.

In the manner described above, if the user performs an operation on the mobile phone 100, the mobile phone 100 opens a corresponding file. The following describes another manner. In this manner, if the user performs an operation on the mobile phone 100, the mobile phone 100 may provide an option for the user, and the user chooses to open a corresponding file on the mobile phone 100 or the portable computer. In this manner, a device on which the file is finally opened better meets a requirement of the user.

For example, the user performs a second operation on the mobile phone 100. The second operation is, for example, a touch operation, and the second operation is used to open a first file. Still refer to FIG. 5A. The second operation is an operation of touching a file icon "file 3" on the display interface of the mobile phone by the user by using a finger, which indicates that the user wants to open the file 3. The touch sensor 180K on the display 194 of the mobile phone 100 may capture the second operation, and obtain event information of the second operation. The touch sensor 180K may send the event information of the second operation to the first manager software. The event information of the second operation includes, for example, an identifier of the mobile phone 100, and optionally, may further include position information and the like of the second operation. The position information of the second operation is, for example, absolute position information of the second operation on the display 194. It should be understood that the touch operation in this specification may be replaced with a floating operation, a voice instruction, and the like. In this specification, the touch operation is used as an example for description, but this does not constitute a limitation on embodiments of this application.

Figure 7A:
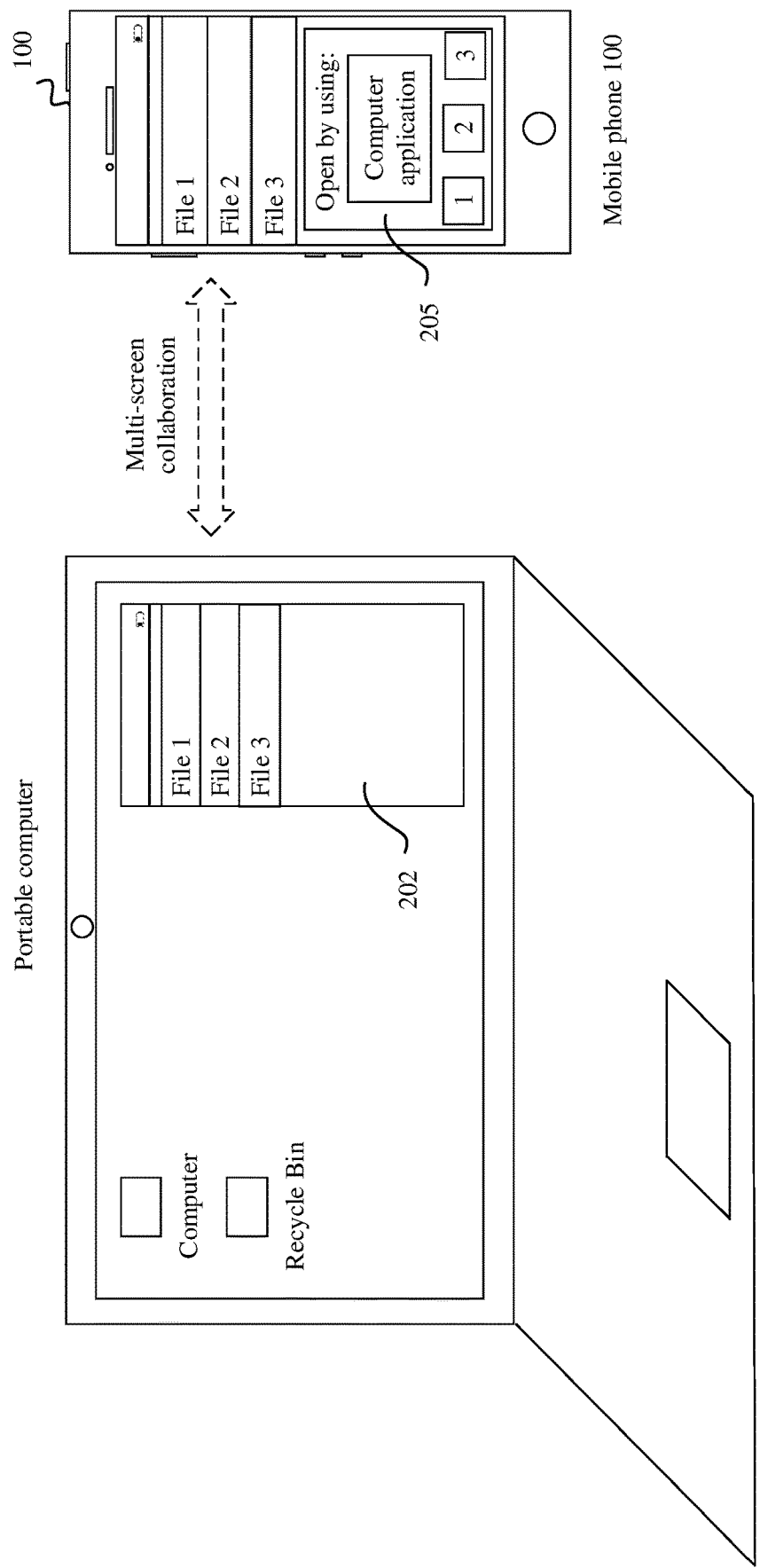
FIG. 7A is a schematic diagram of displaying prompt information on a mobile phone 100 according to an embodiment of this application.

After the first manager software obtains the event information of the second operation, because the event information of the second operation includes the identifier of the mobile phone 100, the first manager software may determine that the event information of the second operation corresponds to the mobile phone 100, that is, determines that the second operation is an operation performed on the mobile phone 100. In other words, the first manager software determines that a file icon (for example, the file icon "file 3") corresponding to the second operation is located on the display interface of the mobile phone 100. In this case, the first manager software may output prompt information 205 by using the display 194, and the prompt information 205 may include one or more options, and the prompt information 205 may be used to determine a device on which the file 3 is to be opened. For example, FIG. 7A is a schematic diagram of the prompt information 205 displayed on the display 194 of the mobile phone 100. For example, the prompt information 205 includes four options. One option is "Computer application", which indicates that the file 3 is to be opened on a collaboration device (for example, the portable computer). The remaining three options are "1", "2", and "3", which respectively represent an application 1, an application 2, and an application 3. All the three applications are applications on the mobile phone 100, and are also applications that can open the file 3. One or more applications on the mobile phone 100 can open the first file. If only one application on the mobile phone 100 can open the first file, the prompt information 205 displays only one option in addition to the option "Computer application". Alternatively, if a plurality of applications on the mobile phone 100 can open the first file, the prompt information 205 may display options corresponding to all applications or some applications that can open the first file in addition to the option "Computer application". If the user selects the option "Computer application", it indicates that the user chooses to open the first file on the collaboration device. If the user selects any application other than the "computer application", it indicates that the user chooses to open the first file on the mobile phone 100 by using the application.

Figure 7B:
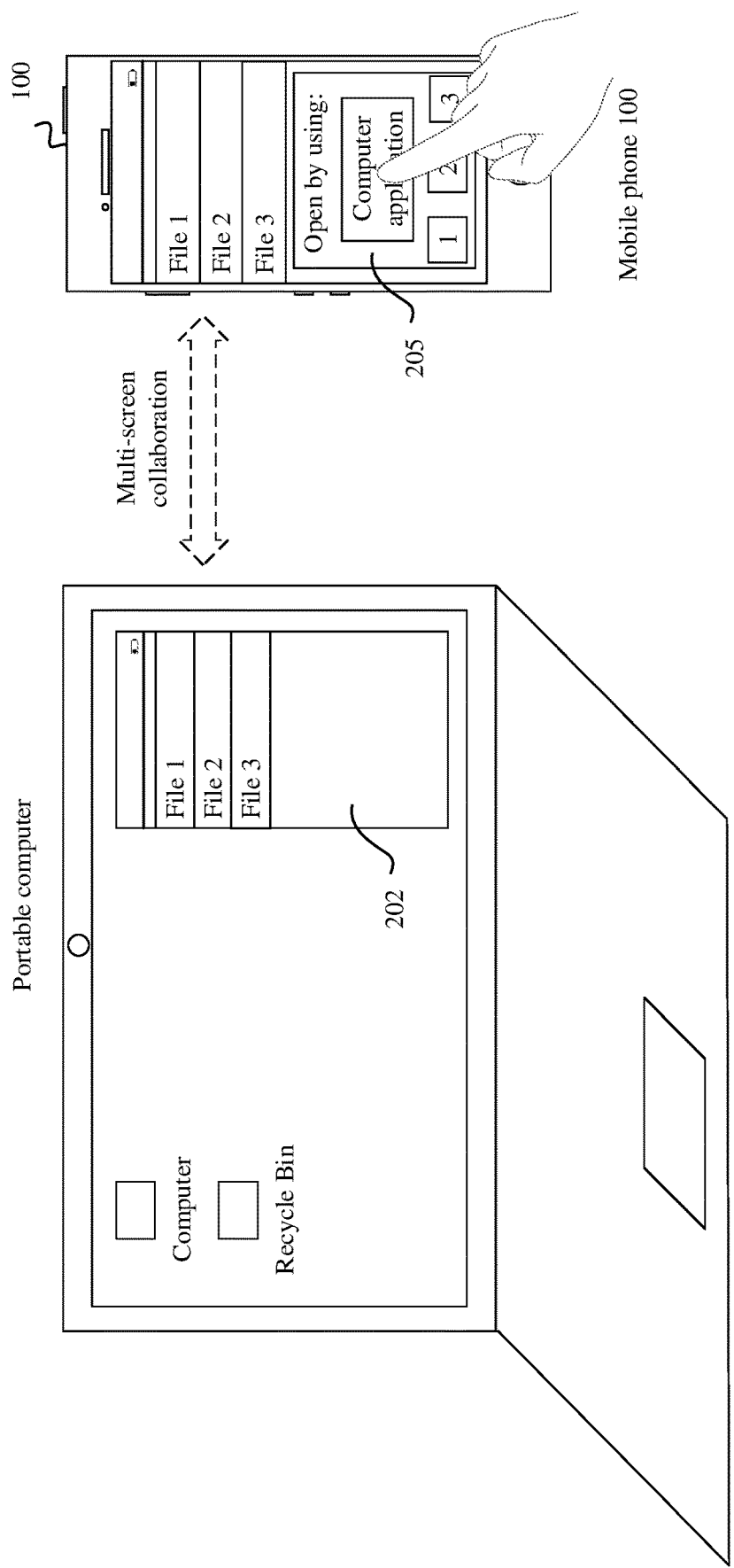
FIG. 7B is a schematic diagram in which a user performs an operation on an option included in prompt information according to an embodiment of this application.

As shown in FIG. 7B, for example, the user touches, by using a finger, the option "Computer application" included in the prompt information 205, and it indicates that the user selects the "computer application". In this case, the distributed file system of the mobile phone 100 may synchronize metadata of the first file corresponding to the first operation to the distributed file system of the portable computer. For the metadata of the file, refer to the foregoing description. For an operation process after the portable computer obtains the metadata of the first file, refer to the foregoing descriptions of the process of opening the file 3 on the portable computer.

Figure 7C:
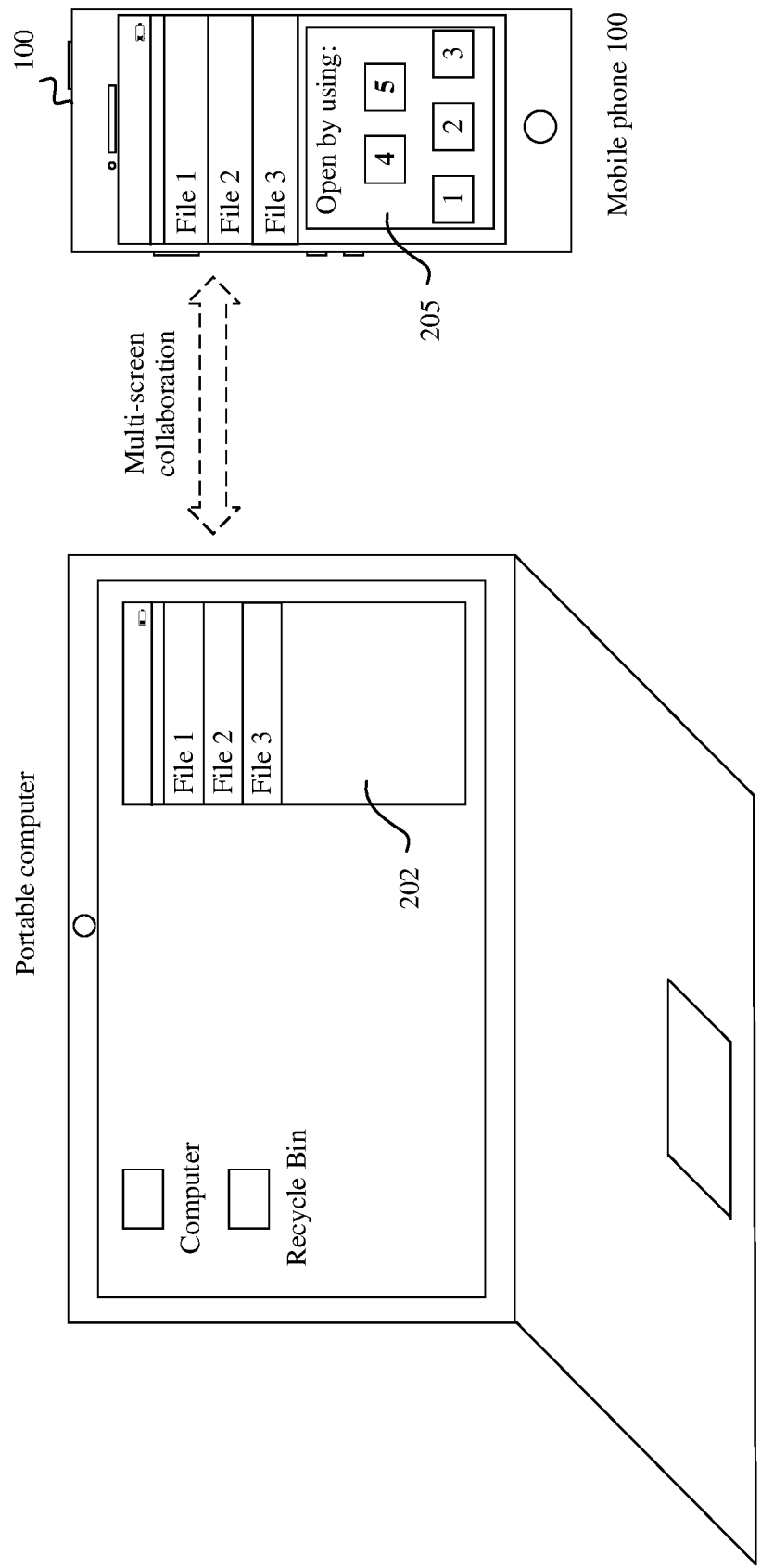
FIG. 7C is another schematic diagram of displaying prompt information on a mobile phone 100 according to an embodiment of this application.

Optionally, in FIG. 7A or FIG. 7B, the prompt information 205 output by the mobile phone 100 may not include a specific option on the portable computer. That is, the user cannot select a specific application on the portable computer based on the prompt information 205 output by the mobile phone 100. For example, in FIG. 7A or FIG. 7B, if the user chooses to open the application on the portable computer, the user may select the option "Computer application", and the option corresponds to only the portable computer, and does not correspond to a specific application on the portable computer. If the user chooses to open the first file on the portable computer, the portable computer selects, based on a type of the first file, a corresponding application to open the first file. Alternatively, in another manner, the prompt information 205 output by the mobile phone 100 may include an option on the portable computer. For example, FIG. 7C is a schematic diagram of another prompt information 205 displayed on the display 194 of the mobile phone 100. For example, the prompt information 205 includes five options. The five options are "1", "2", "3", "4", and "5", which respectively represent an application 1, an application 2, an application 3, an application 4, and an application 5. The application 4 and the application 5 are applications on the portable computer, and are also applications that can open the file 3, and this indicates that the file 3 is opened on the collaboration device (for example, the portable computer). The application 1, the application 2, and the application 3 are applications on the mobile phone 100, and are also applications that can open the file 3. In FIG. 7B, display fonts of "4" and "5" are larger and thicker, indicating that the application 4 and the application 5 are applications on the portable computer, or another prompt manner may be used to indicate that a corresponding application is an application on the portable computer, for example, a prompt text may be displayed. In this manner, the user may select an application that is used to open the first file on the portable computer, so that viewing experience of the user is better.

Figure 7D:
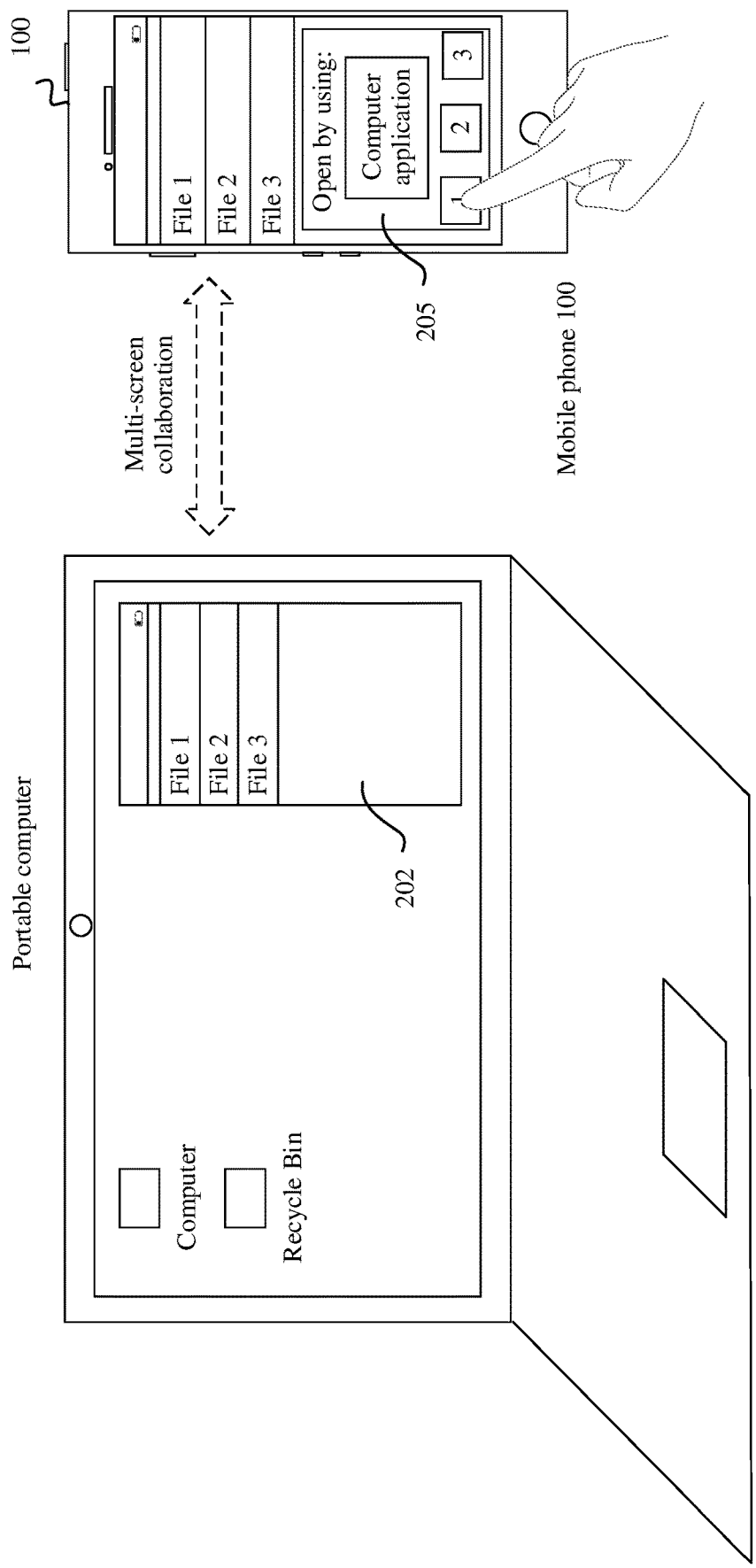
FIG. 7D is another schematic diagram in which a user performs an operation on an option included in prompt information according to an embodiment of this application.

Alternatively, as shown in FIG. 7D, for example, the user touches the option "1" by using a finger, and it indicates that the user chooses to open the first file on the mobile phone 100 by using the application 1 corresponding to "1", and the first manager software may invoke the application 1 corresponding to "1" to open the file 3. For an operation process after the first manager software invokes the application 1 corresponding to "1" to open the file 3, refer to the foregoing descriptions of the process of opening the file 3 on the mobile phone 100.

For example, sometimes although the user performs an operation on the mobile phone 100, the user actually expects to present a corresponding file on the portable computer to another user for viewing. In this scenario, according to the technical solution provided in embodiments of this application, the user may choose to open the file on the portable computer, so as to complete a presentation process. It can be learned that according to the technical solution provided in embodiments of this application, a selection opportunity is provided for the user, and it is more convenient for the user to select a proper device to open a corresponding file.

In the multi-screen collaboration mode, the collaboration window displayed on the second device is a mirror of the display interface of the first device. Therefore, according to an existing manner, regardless of whether the user performs an operation on the first device or the collaboration window of the second device, an operation process is of a same source, and finally, the second device actually responds to the operation of the user. However, embodiments of this application breaks such a "same source" barrier by using a technology. A determining mechanism is added to the first device. For a same file, if the user performs an operation on different devices, the file may be opened on the different devices. Therefore, differentiated experience different from the conventional technology is generated, and better user experience can be provided for the user. In addition, the user does not need to open a corresponding file on the first device after exiting the multi-screen collaboration mode, which simplifies operation steps of the user, reduces a response process of the device, and helps reduce power consumption of the device.

Figure 8A:
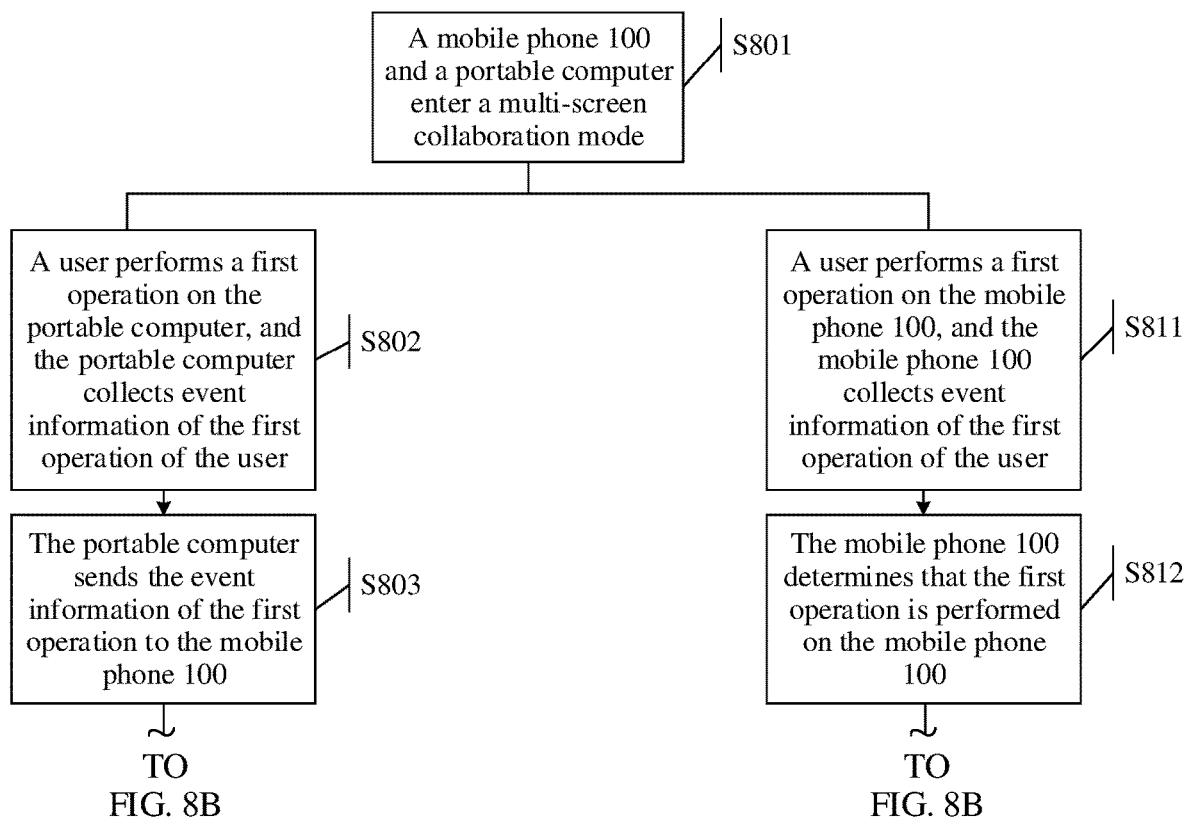
FIG. 8A and FIG. 8B are a flowchart of a first file opening method according to an embodiment of this application.
Figure 8B:
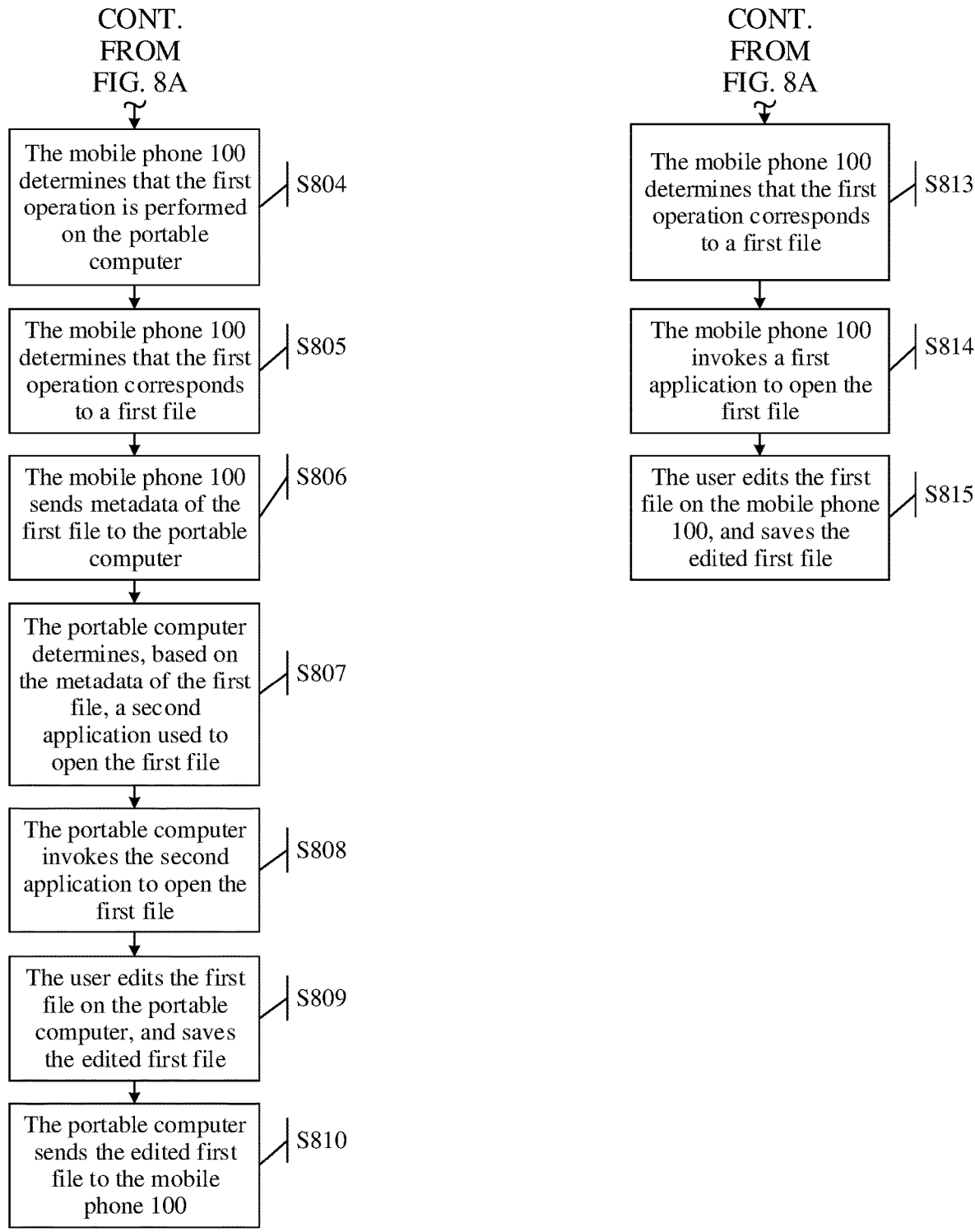

With reference to the foregoing embodiments and related accompanying drawings, an embodiment of this application provides a first file opening method. The method may be used in a multi-screen collaboration scenario. For example, the method relates to a first device and a second device. For a structure of the first device, refer to FIG. 1. Refer to FIG. 8A and FIG. 8B. The following describes a procedure of the method. For ease of understanding, in the following description process, an example in which the first device is the mobile phone 100 and the second device is the portable computer is used.

The mobile phone 100 and the portable computer enter a multi-screen collaboration mode in a preset manner. For example, if the mobile phone 100 and the portable computer enter the multi-screen collaboration mode as long as a connection is established, S801 may also be replaced with: The mobile phone 100 and the portable computer establish a connection. Alternatively, the mobile phone 100 and the portable computer need to first establish a connection, and then a user performs a corresponding operation, so that the mobile phone 100 and the portable computer enter the multi-screen collaboration mode. In this case, before S801, the mobile phone 100 and the portable computer need to first establish a connection.

There may be a plurality of operation manners for the mobile phone 100 and the portable computer to enter the multi-screen collaboration mode. For example, the user may hold the mobile phone 100 to tap the portable computer, and the mobile phone 100 and the portable computer may establish an NFC connection, and enter the multi-screen collaboration mode. In this case, the preset manner is the "OneHop" manner. Alternatively, the preset manner may be another manner. For specific content, refer to the foregoing descriptions.

After the mobile phone 100 and the portable computer enter the multi-screen collaboration mode, a first interface is displayed on a display of the portable computer, and the first interface is a mirror of a display interface of the mobile phone 100. It may be understood that the mobile phone 100 displays the first interface, the portable computer displays a second interface, and the mobile phone 100 may project the first interface onto the display of the portable computer, or in other words, project the first interface onto the second interface. After the projection, the second interface includes the first interface. The first interface may include at least one file icon. Each file icon corresponds to one file, the at least one file icon corresponds to at least one file, and the at least one file is stored in the mobile phone 100. For example, the first interface is the projection interface 202 shown in FIG. 3C, "file 1", "file 2", and "file 3" represent three file icons, and the three file icons correspond to three files: a file 1, a file 2, and a file 3.

For more content of S801, refer to the foregoing descriptions.

S802: The user performs an operation on the portable computer, and the portable computer collects the operation of the user and obtains event information corresponding to the operation. For example, the operation is referred to as a first operation, and the portable computer may capture the first operation and obtain the event information of the first operation. The first operation may be performed on a file icon. For example, the file icon is referred to as a first file icon, and the first file icon may belong to the at least one file icon. That is, the user performs the first operation on the first file icon on the first interface included in the second interface displayed on the portable computer. The first file icon corresponds to one file, for example, the file is referred to as a first file. For descriptions of the event information of the first operation, refer to the foregoing related content.

For example, the first operation is a touch operation. For an example, refer to FIG. 4A. Alternatively, the first operation may be another type of operation, for example, a gesture operation, a sound control operation, or a floating operation. A purpose of performing the first operation by the user is to open the first file. Therefore, the first operation is an operation of opening the first file.

For more content of S802, refer to the foregoing descriptions.

S803: The portable computer sends the event information of the first operation to the mobile phone 100, and the mobile phone 100 receives the event information of the first operation from the portable computer. The mobile phone 100 receiving the event information of the first operation may also be equivalent to the mobile phone 100 detecting the operation performed on the first file icon.

For example, a sensor (for example, a touch sensor or another sensor) in the portable computer collects the event information of the first operation, and sends the event information of the first operation to a second manager software installed on the portable computer. The second manager software may send the event information of the first operation to a first manager software installed on the mobile phone 100, and the first manager software receives the event information of the first operation from the second manager software. The first manager software receiving the event information of the first operation may also be equivalent to the first manager software detecting the operation performed on the first file icon.

For more content of S803, refer to the foregoing descriptions.

S804: The mobile phone 100 determines that the event information of the first operation corresponds to the portable computer. In other words, the mobile phone 100 determines that the first operation is performed on the portable computer. In other words, the mobile phone 100 determines that the first operation (or the event information of the first operation) is performed on the display of the portable computer. In other words, the mobile phone 100 determines that the file icon corresponding to the first operation is located on a display interface of the portable computer. That the first operation corresponds to the portable computer means that the first operation is an operation performed on the portable computer.

For example, after the first manager software receives the event information of the first operation, because the event information of the first operation includes an identifier of the second device, the first manager software determines that the event information of the first operation corresponds to the portable computer, that is, determines that the first operation is an operation performed on the portable computer. In other words, the first manager software determines that the file icon corresponding to the first operation is located on the display interface of the portable computer. For example, the event information of the first operation indicates that the first operation is a touch operation, and the first manager software may determine that the first operation is an operation performed on the display of the portable computer, or determine that the file icon corresponding to the first operation is located on the display interface of the portable computer.

For more content of S804, refer to the foregoing descriptions.

S805: The mobile phone 100 determines that the file corresponding to the event information of the first operation is the first file, or the mobile phone 100 determines a storage path of the first file corresponding to the event information of the first operation, or the mobile phone 100 determines that the first operation corresponds to the first file.

For example, if the event information of the first operation includes relative position information of the first operation on the first interface, the first manager software may determine a file such as the first file corresponding to the first operation based on an area conversion ratio between the first interface and the display 194 of the mobile phone 100 and the relative position information of the first operation. The first file is, for example, the file 3 described above. In addition, the first manager software may determine a storage path of the first file, and the first manager software creates a soft link corresponding to the first file in a distributed file system of the mobile phone 100. The soft link directs to the storage path of the first file. For example, the soft link directs to a storage path of the first file in an SD card of the mobile phone or a URL of the file. In addition, the soft link is associated with metadata of the first file.

For more content of S805, refer to the foregoing descriptions.

S806: The mobile phone 100 sends the metadata of the first file to the portable computer, and the portable computer receives the metadata of the first file from the mobile phone 100.

For example, the metadata of the first file includes one or more of the following: a name of the first file, type information of the first file, size information of the first file, or storage path information of the first file. For more descriptions of the metadata of the first file, refer to the foregoing descriptions.

For example, the distributed file system of the mobile phone 100 may synchronize (or send) the metadata of the file corresponding to the first operation to a distributed file system of the portable computer.

For more content of S806, refer to the foregoing descriptions.

S807: The portable computer determines, based on the metadata of the first file, an application used to open the first file. The application is, for example, referred to as a second application.

The first manager software may obtain a path of the soft link created in the distributed file system of the mobile phone 100, and the first manager software may send the path of the soft link to the second manager software. In addition, the first manager software can also obtain the metadata of the file, for example, the type information of the file, and the first manager software may also send the obtained metadata of the file to the second manager software. The second manager software determines and invokes, based on the type information of the file and the like, an application that can open the file. For example, the second manager software determines that the second application can open the file.

For more content of S807, refer to the foregoing descriptions.

S808: The portable computer invokes the second application to open the first file.

The first file, that is, data of the first file is obtained from the mobile phone 100 based on the metadata of the first file.

The portable computer invokes the second application, and the second application opens the soft link based on the path of the soft link. In this case, the distributed file system of the portable computer may obtain the first file from the mobile phone 100 based on the metadata corresponding to the soft link. This may be understood as obtaining the data of the first file from the mobile phone 100. For example, the distributed file system of the portable computer may obtain the first file from the mobile phone 100 based on the storage path information of the first file included in the metadata corresponding to the soft link. Therefore, the second application can open the first file. In addition, the portable computer may further store the data of the first file in the portable computer. For example, the portable computer may store the data of the first file in a local file system of the portable computer by using the second application, for example, may store the data of the first file as a temporary file.

For an example in which the second manager software opens the first file, refer to any one of FIG. 4B to FIG. 4D.

For more content of S808, refer to the foregoing descriptions.

S809: The user edits the first file on the portable computer, and saves the edited first file. The edited first file is, for example, referred to as a second file, or may also be referred to as an updated file. A name of the file is not limited.

The user may view the first file on the portable computer, or may perform an editing operation on the first file on the portable computer, for example, may delete content, add content, or modify content in the first file. After the user completes an operation on the first file, the first file may be saved. In this case, the portable computer may update the stored first file, or update the data of the first file, to obtain updated data of the first file. The updated data of the first file may be understood as the updated first file, that is, the second file.

For more content of S809, refer to the foregoing descriptions.

S810: The portable computer sends the second file to the mobile phone 100, and the mobile phone 100 receives the second file from the portable computer.

The portable computer may send the second file to the mobile phone 100. For example, the portable computer may synchronize the second file to the distributed file system of the mobile phone 100 by using the distributed file system of the portable computer, so that the mobile phone 100 can use the second file to overwrite the first file stored in a local file system of the mobile phone. In this way, the first file is updated. The portable computer may send the obtained second file to the mobile phone 100 each time after the user updates the first file, so that the first file can be updated in time on the mobile phone side. Alternatively, the portable computer may send the obtained second file to the mobile phone 100 after the user closes the first file, to reduce a quantity of times of sending updated data and reduce transmission overheads.

In addition, after the portable computer sends the second file to the mobile phone 100, the portable computer may delete the stored second file to release storage space.

For more content of S810, refer to the foregoing descriptions.

S811: The user performs an operation on the mobile phone 100, and the mobile phone 100 collects the operation of the user, and obtains event information corresponding to the operation, or the mobile phone 100 detects the event information corresponding to the operation. For example, the operation is referred to as a first operation, and the mobile phone 100 may capture the first operation and obtain the event information of the first operation. The first operation may be performed on a file icon. For example, the file icon is referred to as a first file icon, and the first file icon may belong to the at least one file icon. That is, the user performs the first operation on the first file icon on the first interface displayed on the mobile phone 100. The first file icon corresponds to one file, for example, the file is referred to as the first file.

The mobile phone 100 collecting (or detecting) the event information of the first operation of the user is equivalent to the mobile phone 100 detecting the first operation performed on the first file icon.

For example, the first operation is a touch operation. For an example, refer to FIG. 5A. Alternatively, the first operation may be another type of operation, for example, a gesture operation, a sound control operation, or a floating operation. A purpose of performing the first operation by the user is to open the first file. Therefore, the first operation is an operation of opening the first file.

For more content of S811, refer to the foregoing descriptions.

S812: The mobile phone 100 determines that the event information of the first operation corresponds to the mobile phone 100. In other words, the mobile phone 100 determines that the first operation is performed on the mobile phone 100. In other words, the mobile phone 100 determines that the first operation (or the event information of the first operation) is performed on the display of the mobile phone 100. In other words, the mobile phone 100 determines that the file icon corresponding to the first operation is located on a display interface of the mobile phone 100. That the first operation corresponds to the mobile phone 100 means that the first operation is an operation performed on the mobile phone 100.

For example, after the first manager software obtains the event information of the first operation, because the event information of the first operation includes an identifier of the mobile phone 100, the first manager software may determine that the event information of the first operation corresponds to the mobile phone 100, that is, determines that the second operation is an operation performed on the mobile phone 100. In other words, the first manager software determines that a file icon corresponding to the second operation is located on the display interface of the mobile phone 100. For example, the event information of the first operation indicates that the first operation is a touch operation, and the first manager software may determine that the touch operation is an operation performed on the display of the mobile phone 100, or determine that the file icon corresponding to the touch operation is located on the display interface of the mobile phone 100.

For more content of S812, refer to the foregoing descriptions.

S813: The mobile phone 100 determines that the file corresponding to the event information of the first operation is the first file, or the mobile phone 100 determines a storage path of the first file corresponding to the event information of the first operation, or the mobile phone 100 determines that the first operation corresponds to the first file.

For example, if the event information of the first operation includes absolute position information of the first operation on the display interface of the mobile phone, the first manager software may determine a file such as the first file corresponding to the first operation based on the position information of the first operation, or the first manager software may determine a storage path of the first file. The first file is, for example, the file 3 described above.

For more content of S813, refer to the foregoing descriptions.

S814: The mobile phone 100 invokes a first application to open the first file.

For example, the first manager software may determine, based on a type of the first file, an application that can open the first file, for example, the first application.

For more content of S814, refer to the foregoing descriptions.

S815: The user edits the first file on the mobile phone 100, and saves the edited first file. The edited first file is, for example, referred to as a second file.

For more content of S815, refer to the foregoing descriptions.

The user may view the first file on the mobile phone 100, or may perform an editing operation on the first file on the mobile phone 100, for example, may delete content, add content, or modify content in the first file. After the user completes an operation on the first file, the first file may be saved. In this case, the mobile phone 100 may update the first file stored in a memory, or update the data of the first file, to obtain updated data of the first file. The updated data of the first file may be understood as the updated first file, that is, the second file.

S802 to S810 and S811 to S815 are two parallel solutions, and may not occur at the same time. For example, when the user performs an operation, if the user chooses to perform the operation on the portable computer, S802 to S810 may be performed; if the user chooses to perform an operation on the mobile phone 100, S811 to S815 may be performed.

For a same file in the first device, after the method provided in this embodiment of this application is used, final experience effects of an operation on the mobile phone 100 and an operation in a collaboration window (for example, a projection interface 202) mirrored by the mobile phone 100 to the portable computer are different. Even in a multi-screen collaboration scenario, the mobile phone 100 may intelligently select a device (for example, the mobile phone 100 or the portable computer) based on a current focus of the user (for example, a device on which the operation of the user is performed), to open, edit, and save a corresponding file, the user can complete office work without leaving or switching the current focused screen, to provide better preview and editing experience for the user.

In the first file opening method, if the user performs an operation on the mobile phone 100, the mobile phone 100 opens a corresponding file. Next, an embodiment of this application further provides a second file opening method. In this method, if the user performs an operation on the mobile phone 100, the mobile phone 100 may provide an option for the user, and the user chooses to open a corresponding file on the mobile phone 100 or the portable computer. The second file opening method provided in this embodiment of this application may be used in a multi-screen collaboration scenario. For example, the method relates to a first device and a second device. For a structure of the first device, refer to FIG. 1. Refer to FIG. 9A and FIG. 9B. The following describes a procedure of the method. For ease of understanding, in the following description process, an example in which the first device is the mobile phone 100 and the second device is the portable computer is used.

S901: The mobile phone 100 and the portable computer enter a multi-screen collaboration mode in a preset manner.

For more content of S901, refer to the descriptions of S801 in the embodiment shown in FIG. 8A and FIG. 8B or the foregoing descriptions.

S902: The user performs an operation on the portable computer, and the portable computer collects the operation of the user and obtains event information corresponding to the operation. For example, the operation is referred to as a first operation, and the portable computer may capture the first operation and obtain the event information of the first operation. The first operation may be performed on a file icon. For example, the file icon is referred to as a first file icon, and the first file icon may belong to at least one file icon. That is, the user performs the first operation on the first file icon on a first interface included in a second interface displayed on the portable computer. The first file icon corresponds to one file, for example, the file is referred to as a first file.

For more content of S902, refer to the descriptions of S802 in the embodiment shown in FIG. 8A and FIG. 8B or the foregoing descriptions.

S903: The portable computer sends the event information of the first operation to the mobile phone 100, and the mobile phone 100 receives the event information of the first operation from the portable computer. The mobile phone 100 receiving the event information of the first operation may also be equivalent to the mobile phone 100 detecting the operation performed on the first file icon.

For more content of S903, refer to the descriptions of S803 in the embodiment shown in FIG. 8A and FIG. 8B or the foregoing descriptions.

S904: The mobile phone 100 determines that the event information of the first operation corresponds to the portable computer. In other words, the mobile phone 100 determines that the first operation is performed on the portable computer. In other words, the mobile phone 100 determines that the first operation (or the event information of the first operation) is performed on a display of the portable computer. In other words, the mobile phone 100 determines that the file icon corresponding to the first operation is located on a display interface of the portable computer. That the first operation corresponds to the portable computer means that the first operation is an operation performed on the portable computer.

For more content of S904, refer to the descriptions of S804 in the embodiment shown in FIG. 8A and FIG. 8B or the foregoing descriptions.

S905: The mobile phone 100 determines that the file corresponding to the event information of the first operation is the first file, or the mobile phone 100 determines a storage path of the first file corresponding to the event information of the first operation, or the mobile phone 100 determines that the first operation corresponds to the first file.

For more content of S905, refer to the descriptions of S805 in the embodiment shown in FIG. 8A and FIG. 8B or the foregoing descriptions.

S906: The mobile phone 100 sends metadata of the first file to the portable computer, and the portable computer receives the metadata of the first file from the mobile phone 100.

For more content of S906, refer to the descriptions of S806 in the embodiment shown in FIG. 8A and FIG. 8B or the foregoing descriptions.

S907: The portable computer determines, based on the metadata of the first file, an application used to open the first file. The application is, for example, referred to as a second application.

For more content of S907, refer to the descriptions of S807 in the embodiment shown in FIG. 8A and FIG. 8B or the foregoing descriptions.

S908: The portable computer invokes the second application to open the first file.

For more content of S908, refer to the descriptions of S808 in the embodiment shown in FIG. 8A and FIG. 8B or the foregoing descriptions.

S909: The user edits the first file on the portable computer, and saves the edited first file. The edited first file is, for example, referred to as a second file, or may also be referred to as an updated file. A name of the file is not limited.

For more content of S909, refer to the descriptions of S809 in the embodiment shown in FIG. 8A and FIG. 8B or the foregoing descriptions.

S910: The portable computer sends the second file to the mobile phone 100, and the mobile phone 100 receives the second file from the portable computer.

For more content of S910, refer to the descriptions of S810 in the embodiment shown in FIG. 8A and FIG. 8B or the foregoing descriptions.

S911: The user performs an operation on the mobile phone 100, and the mobile phone 100 collects information about the operation of the user, and obtains event information corresponding to the operation, or the mobile phone 100 detects the event information corresponding to the operation. For example, the operation is referred to as a first operation, and the mobile phone 100 may capture the first operation and obtain the event information of the first operation. The first operation may be performed on a file icon. For example, the file icon is referred to as a first file icon, and the first file icon may belong to at least one file icon. That is, the user performs the first operation on the first file icon on a first interface displayed on the mobile phone 100. The first file icon corresponds to one file, for example, the file is referred to as a first file.

The mobile phone 100 collecting (or detecting) event information of the first operation of the user is equivalent to the mobile phone 100 detecting the first operation performed on the first file icon.

For more content of S911, refer to the descriptions of S811 in the embodiment shown in FIG. 8A and FIG. 8B or the foregoing descriptions.

S912: The mobile phone 100 determines that the event information of the first operation corresponds to the mobile phone 100. In other words, the mobile phone 100 determines that the first operation is performed on the mobile phone 100. In other words, the mobile phone 100 determines that the first operation (or the event information of the first operation) is performed on a display of the mobile phone 100. In other words, the mobile phone 100 determines that the file icon corresponding to the first operation is located on a display interface of the mobile phone 100.

For more content of S912, refer to the descriptions of S812 in the embodiment shown in FIG. 8A and FIG. 8B or the foregoing descriptions.

S913: The mobile phone 100 outputs prompt information, where the prompt information is used to determine a device that is to open the first file.

For example, the mobile phone 100 may output the prompt information by using the display 194. The prompt information may include one or more options, and the one or more options may be used to determine a device on which the first file is to be opened. For an example of the prompt information, refer to FIG. 7A or FIG. 7B.

For more content of S913, refer to the foregoing descriptions.

S914: The user selects a first option in the one or more options, and the mobile phone 100 detects an operation of selecting the first option.

For example, still as shown in FIG. 7D, if the user touches an option "i" by using a finger, the touch sensor 180K may detect the operation, and may collect event information of the operation. After collecting the event information of the operation, the touch sensor 180K may send the event information of the operation to a first manager software. After receiving the event information of the operation from the touch sensor 180K, the first manager software determines that the user chooses to open the first file on the mobile phone 100 by using an application 1 corresponding to "i".

For example, the first option corresponds to a first application, and for example, the first application is installed on the mobile phone 100.

For more content of S914, refer to the foregoing descriptions.

S915: The mobile phone 100 determines that the file corresponding to the event information of the first operation is the first file, or the mobile phone 100 determines a storage path of the first file corresponding to the event information of the first operation, or the mobile phone 100 determines that the first operation corresponds to the first file.

For more content of S915, refer to the descriptions of S813 in the embodiment shown in FIG. 8A and FIG. 8B or the foregoing descriptions.

S916: The mobile phone 100 invokes a first application to open the first file.

For more content of S916, refer to the descriptions of S814 in the embodiment shown in FIG. 8A and FIG. 8B or the foregoing descriptions.

S917: The user edits the first file on the mobile phone 100, and saves the edited first file. The edited first file is, for example, referred to as a second file.

For more content of S917, refer to the descriptions of S815 in the embodiment shown in FIG. 8A and FIG. 8B or the foregoing descriptions.

S918: The user selects a second option in the one or more options included in the prompt information, and the mobile phone 100 detects an operation of selecting the second option.

For example, still as shown in FIG. 7B, if the user touches an option "Computer application" by using a finger, the touch sensor 180K may detect the operation, and may collect event information of the operation. After collecting the event information of the operation, the touch sensor 180K may send the event information of the operation to the first manager software. After receiving the event information of the operation from the touch sensor 180K, the first manager software determines that the user chooses to open the first file on the portable computer.

For more content of S918, refer to the foregoing descriptions.

After S918 is performed, S906 to S910 may continue to be performed. Details are not described again.

S902 to S910, and S911 to S918 and subsequent steps are two parallel solutions, and may not occur at the same time. For example, when the user performs an operation, if the user chooses to perform the operation on the portable computer, S902 to S910 may be performed; if the user chooses to perform an operation on the mobile phone 100, S911 to S918 and subsequent steps may be performed. In addition, S914 to S917, and S918 and subsequent steps are also two parallel solutions, and may not occur at the same time. For example, when the user performs an operation based on the prompt information, if the user chooses to open the first file on the portable computer, S918 and subsequent steps may be performed; if the user chooses to open the first file on the mobile phone 100, S914 to S917 may be performed.

For example, sometimes although the user performs an operation on the mobile phone 100, the user actually expects to present a corresponding file on the portable computer to another user for viewing. In this scenario, according to the technical solution provided in this embodiment of this application, the user may choose to open the file on the portable computer, so as to complete a presentation process.

It can be learned that according to the technical solution provided in this embodiment of this application, a selection opportunity is provided for the user, and it is more convenient for the user to select a proper device to open a corresponding file.

In the foregoing embodiments provided in this application, the method provided in embodiments of this application is described from perspectives of the mobile phone 100 and the portable computer serving as execution bodies. To implement functions in the foregoing methods provided in embodiments of this application, the mobile device (for example, the mobile phone 100 or the portable computer) may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

As shown in FIG. 10, some other embodiments of this application disclose an electronic device. The electronic device is, for example, a mobile phone (for example, a mobile phone 100), a Pad, or a portable computer. The electronic device may include: a touchscreen 1001, where the touchscreen 1001 includes a touch-sensitive surface 1006 and a display 1007; an application 1008; one or more processors 1002; and one or more memories 1003, configured to store one or more programs 1004. The foregoing components may be connected through one or more communications buses 1005. The display 1007 may be configured to display content of a file in the electronic device; or the display 1007 may be further configured to display a desktop of the electronic device; or the display 1007 may be configured to display an image, or the like.

When the one or more programs 1004 stored in the memory 1003 are executed by the one or more processors 1002, the electronic device may be configured to perform steps in the embodiment shown in FIG. 8A and FIG. 8B, the embodiment shown in FIG. 9A and FIG. 9B, or another corresponding embodiment.

It should be noted that, in this embodiment of this application, division into the units is an example, and is merely a logical function division. In actual implementation, another division manner may be used. Functional units in embodiments of the present invention may be integrated into one processing unit, or each of the units may exist alone physically, or two or more units are integrated into one unit. For example, in the foregoing embodiments, a first obtaining unit and a second obtaining unit may be a same unit, or may be different units. The integrated unit may be implemented in a form of hardware, or may be implemented in a form of a software function unit, or may be implemented in a form of a combination of hardware and a software function unit.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if determining" or "in response to determining" or "when (a stated condition or event) is detected" or "in response to detecting (a stated condition or event)".

All or some of the foregoing embodiments may be implemented through software, hardware, firmware, or any combination thereof. When software is used to implement embodiments, embodiments may be implemented completely or partially in a form of a program product. The program product includes one or more computer instructions. When the program instructions are loaded and executed on a computer, the procedure or functions according to embodiments of this application are all or partially generated. The computer may be a general-purpose computer, a special-purpose computer, a computer network, or another programmable device. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

For a purpose of explanation, the foregoing description is described with reference to a specific embodiment. However, the foregoing example discussion is not intended to be detailed, and is not intended to limit this application to a disclosed precise form. Based on the foregoing teaching content, many modification forms and variation forms are possible. Embodiments are selected and described to fully illustrate the principles of this application and practical application of the principles, so that other persons skilled in the art can make full use of this application and various embodiments that have various modifications applicable to conceived specific usage.

In embodiments provided in this application, the method provided in embodiments of this application is described from a perspective in which a terminal device is used as an execution body. To implement functions in the foregoing method provided in embodiments of this application, the terminal device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

What is claimed is:

1. A method comprising:
    entering, by a first device, a multi-screen collaboration mode in a preset manner for performing multi-screen collaboration with a second device that enters the multi-screen collaboration mode;
    displaying, by the first device, a first interface, and projecting, by the first device, the first interface onto a second interface of the second device, wherein the first interface comprises a file icon, the second interface comprises the first interface, and a file corresponding to the file icon is stored in the first device;
    detecting, by the first device, an operation performed on the file icon on a display screen of the second device;
    sending, by the first device, metadata of the file to the second device, wherein the metadata of the file is used to open the file on the second device by using a second application, wherein after the file is opened on the second device by using the second application, the second interface of the second device comprises the first interface and an interface obtained after the file is opened by using the second application, and the second application is installed on the second device, wherein the metadata of the file comprises storage path information of the file in the first device, type information of the file and size information of the file;

creating, by the first device, a soft link; and sending, by the first device, a path of the soft link to the second device.

2. The method according to claim 1, wherein the method further comprises:

receiving, by the first device, an updated file of the file from the second device; and updating, by the first device, the file with the updated file.

3. The method according to claim 1, wherein sending, by the first device, the metadata of the file to the second device comprises:

sending, by the first device, the metadata of the file to a distributed file system of the second device using a distributed file system of the first device.

4. An electronic device comprising:

a display;

one or more processors; and a non-transitory memory; and wherein the non-transitory memory stores one or more programs, the one or more programs comprise instructions, and when the instructions are executed by the electronic device, the electronic device is caused to perform following operations:

entering a multi-screen collaboration mode in a preset manner for performing multi-screen collaboration with a second device that enters the multi-screen collaboration mode;

displaying a first interface on the display, and projecting the first interface onto a second interface of the second device, wherein the first interface comprises a file icon, the second interface comprises the first interface, and a file corresponding to the file icon is stored in the electronic device;

detecting an operation performed on the file icon on a display screen of the second device;

sending metadata of the file to the second device, wherein the metadata of the file is used to open the file on the second device by using a second application, wherein after the file is opened on the second device by using the second application, the second interface of the second device comprises the first interface and an interface obtained after the file is opened by using the second application, and the second application is installed on the second device, wherein the metadata of the file comprises storage path information of the file in the electronic device, type information of the file and size information of the file;

creating a soft link; and sending a path of the soft link to the second device.

5. The electronic device according to claim 4, wherein the operations further comprise:

receiving an updated file of the file from the second device; and updating the file with the updated file.

6. The electronic device according to claim 4, wherein detecting the operation performed on the file icon comprises:

receiving event information from the second device, wherein the event information indicates the operation, and the event information comprises an identifier of the second device; or detecting, on the electronic device, event information generated by the operation.

7. The electronic device according to claim 6, wherein determining that the operation is performed on the display screen of the second device comprises:

determining, based on the identifier of the second device, that the operation is performed on the display screen of the second device.

8. The electronic device according to claim 4, wherein sending the metadata of the file to the second device comprises:

sending the metadata of the file to a distributed file system of the second device using a distributed file system of the electronic device.

9. A non-transitory computer-readable storage medium storing a program, wherein when the program is run on an electronic device, the electronic device is caused to perform following operations:

entering a multi-screen collaboration mode in a preset manner for performing multi-screen collaboration with a second device that enters the multi-screen collaboration mode;

displaying a first interface, and projecting the first interface onto a second interface of the second device, wherein the first interface comprises a file icon, the second interface comprises the first interface, and a file corresponding to the file icon is stored in the electronic device;

detecting an operation performed on the file icon on a display screen of the second device;

sending metadata of the file to the second device, wherein the metadata of the file is used to open the file on the second device by using a second application, wherein after the file is opened on the second device by using the second application, the second interface of the second device comprises the first interface and an interface obtained after the file is opened by using the second application, and the second application is installed on the second device, wherein the metadata of the file comprises storage path information of the file in the electronic device, type information of the file and size information of the file;

creating a soft link; and sending a path of the soft link to the second device.

10. The non-transitory computer-readable storage medium according to claim 9, wherein the operations further comprise:

receiving an updated file of the file from the second device; and updating the file with the updated file.

11. The non-transitory computer-readable storage medium according to claim 9, wherein detecting the operation performed on the file icon comprises:

receiving event information from the second device, wherein the event information indicates the operation, and the event information comprises an identifier of the second device; or detecting, on the electronic device, event information generated by the operation.

12. The non-transitory computer-readable storage medium according to claim 11, wherein determining that the operation is performed on the display screen of the second device comprises:

determining, based on the identifier of the second device, that the operation is performed on the display screen of the second device.

\* \* \* \* \*